United States Patent
Nakagawa

(10) Patent No.: US 7,339,873 B2
(45) Date of Patent: Mar. 4, 2008

(54) DATA RECORDING/REPRODUCING APPARATUS, DATA RECORDING/REPRODUCING METHOD, PROGRAM, AND RECORDING MEDIUM

(75) Inventor: Toshiyuki Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 676 days.

(21) Appl. No.: 10/884,746

(22) Filed: Jul. 2, 2004

(65) Prior Publication Data

US 2005/0025022 A1   Feb. 3, 2005

(30) Foreign Application Priority Data

Jul. 7, 2003 (JP) .......... P2003-192938
Jul. 7, 2003 (JP) .......... P2003-192939

(51) Int. Cl.
  *G11B 5/09* (2006.01)
(52) U.S. Cl. .............. 369/59.23; 369/30.1; 369/47.18; 714/770
(58) Field of Classification Search .......... 369/59.23, 369/30.1, 47.18, 59.24, 30.11, 30.22, 53.35, 369/53.36; 714/770, 769, 6, 763, 746
  See application file for complete search history.

(56) References Cited

U.S. PATENT DOCUMENTS

| 6,079,043 | A |   | 6/2000 | Yoshiura et al. |         |
|-----------|----|---|--------|-----------------|---------|
| 7,188,299 | B2 | * | 3/2007 | Nakagawa et al. | 714/763 |
| 2005/0044469 | A1 | * | 2/2005 | Nakagawa et al. | 714/769 |
| 2005/0204267 | A1 | * | 9/2005 | Nakagawa et al. | 714/770 |

FOREIGN PATENT DOCUMENTS

| JP | 62-221020  | 9/1987  |
| JP | 63-056875  | 3/1988  |
| JP | 06-068602  | 8/1992  |
| JP | 07-037335  | 2/1995  |
| JP | 07-147059  | 6/1995  |
| JP | 10-302390  | 11/1998 |
| JP | 10-334607  | 12/1998 |
| JP | 11-086462  | 3/1999  |
| JP | 2000-276856 | 10/2000 |
| JP | 2000-278645 | 10/2000 |
| JP | 2000-293994 | 10/2000 |
| JP | 2000-353367 | 12/2000 |
| JP | 2002-298517 | 10/2002 |

* cited by examiner

*Primary Examiner*—Ali Neyzari
(74) *Attorney, Agent, or Firm*—Bell, Boyd & Lloyd LLP

(57) ABSTRACT

A data recording/reproducing apparatus for use with a disc recording medium having a plurality of either concentric or spiral tracks formed thereon, each of the tracks being divided into a plurality of sectors is provided. The apparatus includes a seeking element for seeking a target track; a data accessing element for accessing data on the target track reached by the seek; and an error correcting element for correcting error in the data based on an error correction code generated by the error correcting element for error correction purposes. The error correcting element establishes a first error correction code increment per predetermined data quantity, establishes a second error correction code increment for a plurality of first error correction code increments depending on information about status on the disc recording medium, and forms error correction blocks each constituted by a plurality of the first error correction code increments and by the second error correction code increment added to the first error correction code increments.

39 Claims, 25 Drawing Sheets

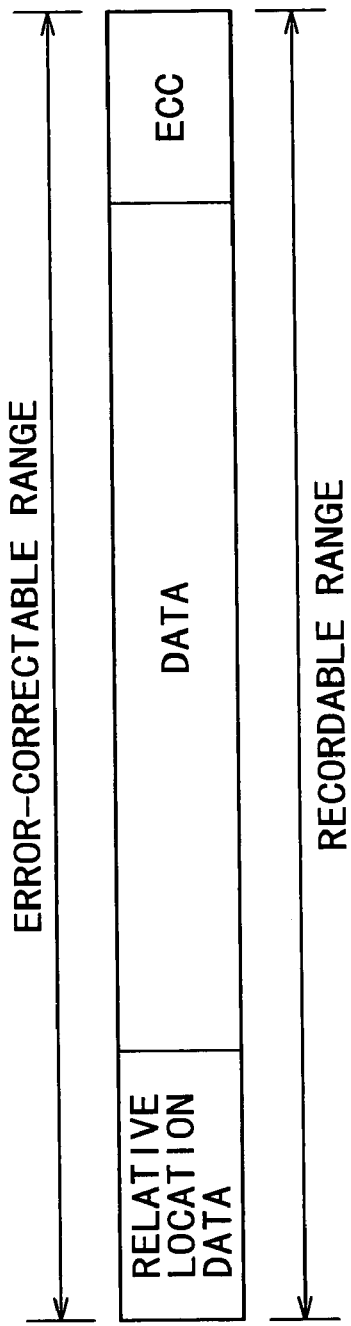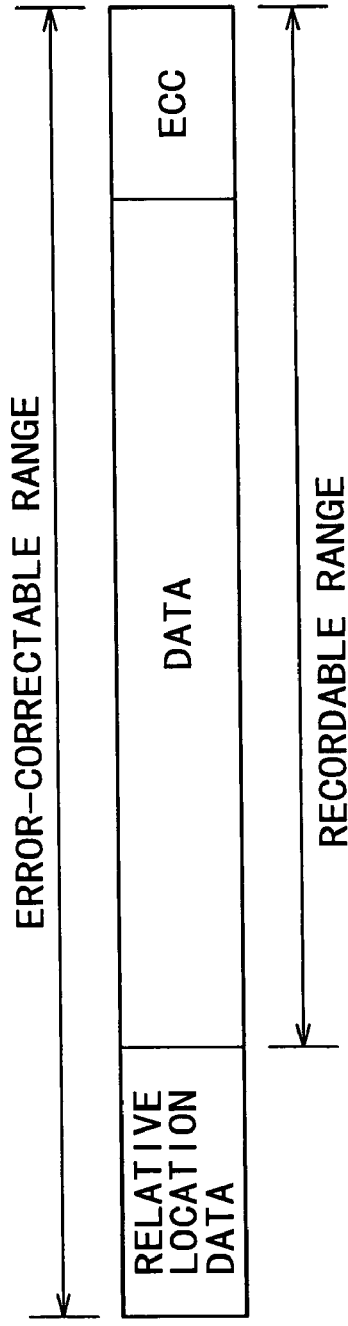

FIG. 5

| CONTENT NO. | TRACK NO. | HEAD NO. |
|---|---|---|
| 1 | 0~99 | 0 |
| 2 | 100~129 | 0 |
| 3 | 200~249 | 0 |
| 4 | 130~199 | 0 |
| 5 | 300~399 | 0 |
| ⋮ | ⋮ | ⋮ |
| ⋮ | ⋮ | ⋮ |
| 9 | 470~499 | 0 |
| NOT USED | — | — |
| NOT USED | — | — |
| NOT USED | — | — |
| ⋮ | ⋮ | ⋮ |
| ⋮ | ⋮ | ⋮ |
| NOT USED | 500~999 | 0 |
| NOT USED | 0~999 | 1 |

EXAMPLE OF SECTORS ARRANGED BETWEEN SERVO ZONES, WHERE INTEGER NUMBER OF SECTORS ARE PROVIDED

1 SECTOR = 512-BYTE DATA + ECC

EXAMPLE OF SECTORS ARRANGED BETWEEN SERVO ZONES, WHERE SECTORS ARE PROVIDED BEYOND SERVO ZONE

1 SECTOR = 512-BYTE DATA + ECC

FIG. 11

| | |
|---|---|
| 0 | HEADER 0 |
| 1 | HEADER 1 |
| 2 | HEADER 2 |
| 3 | HEADER 3 |
| 4 | DATA 0 |
| 5 | DATA 1 |
| 6 | DATA 2 |
| 7 | DATA 3 |
| 8 | DATA 4 |
| 9 | DATA 5 |
| ... | ... |
| 511 | DATA 507 |
| 512 | DATA 508 |
| 513 | DATA 509 |
| 514 | DATA 510 |
| 515 | DATA 511 |
| 516 | CRC 0 |
| 517 | CRC 1 |
| 518 | CRC 2 |
| 519 | CRC 3 |
| 520 | PARITY 000 |
| 521 | PARITY 100 |
| 522 | PARITY 200 |
| 523 | PARITY 300 |
| ... | ... |
| 564 | PARITY 011 |
| 565 | PARITY 111 |
| 566 | PARITY 211 |
| 567 | PARITY 311 |

C2 SECTORS ARE SHOWN CHANGED ZONE BY ZONE.

C2 SECTORS ARE SHOWN CHANGED ZONE BY ZONE
AND REARRANGED DEPENDING ON SLIP STATUS.

SOLID LINES : SERVO AREAS AND SECTOR BOUNDARIES
BROKEN LINES: SECTOR BOUNDARIES

SOLID LINES : SERVO AREAS AND SECTOR BOUNDARIES
BROKEN LINES: SECTOR BOUNDARIES

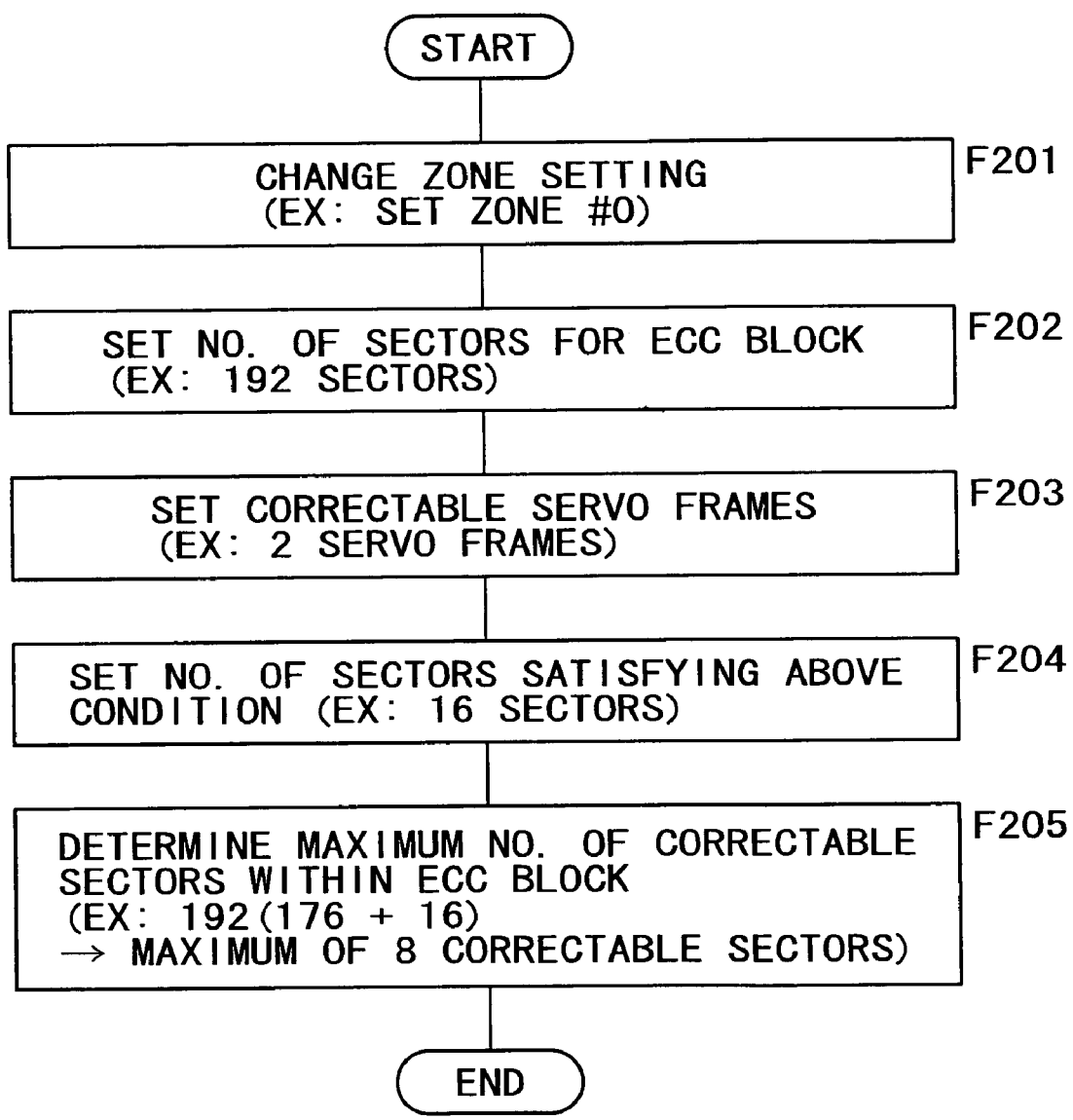

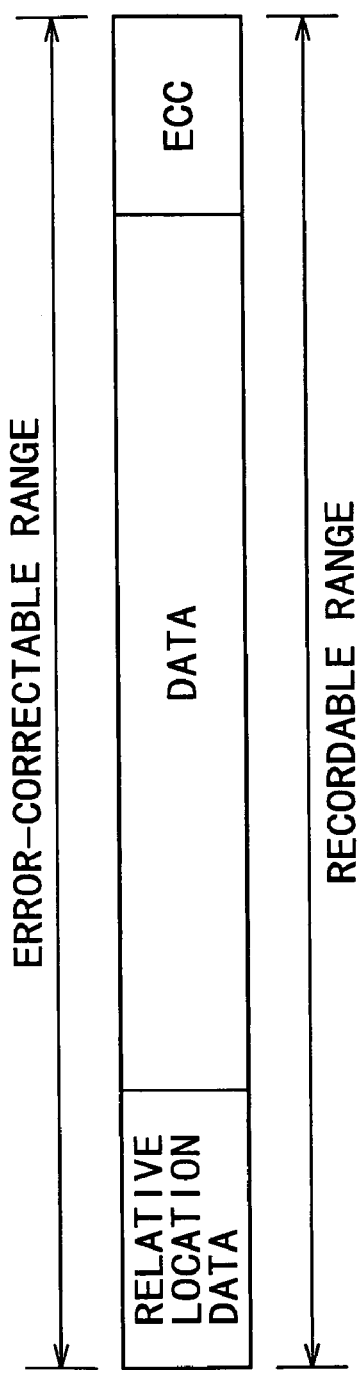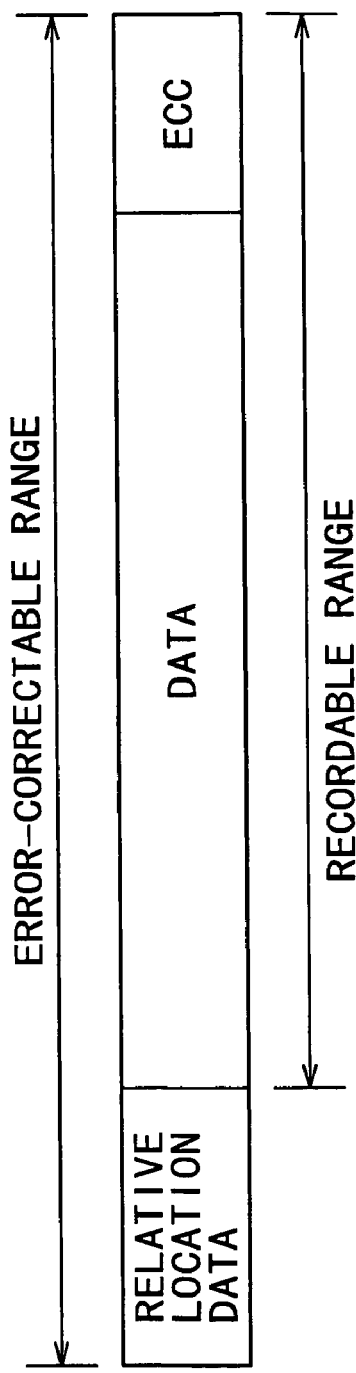

FIG. 21

| CONTENT NO. | TRACK NO. | HEAD NO. |
|---|---|---|
| 1 | 0~99 | 0 |
| 2 | 100~129 | 0 |
| 3 | 200~249 | 0 |
| 4 | 130~199 | 0 |
| 5 | 300~399 | 0 |
| ⋮ | ⋮ | ⋮ |
| ⋮ | ⋮ | ⋮ |
| 9 | 470~499 | 0 |
| NOT USED | — | — |
| NOT USED | — | — |
| NOT USED | — | — |
| ⋮ | ⋮ | ⋮ |
| ⋮ | ⋮ | ⋮ |
| NOT USED | 500~999 | 0 |
| NOT USED | 0~999 | 1 |

DATA RECORDING/REPRODUCING APPARATUS, DATA RECORDING/REPRODUCING METHOD, PROGRAM, AND RECORDING MEDIUM

CROSS REFERENCES TO RELATED APPLICATIONS

This application claims priority to Japanese Patent Application Nos. P2003-192938 filed on Jul. 7, 2003, and P2003-192939 filed on Jul. 7, 2003, the disclosures of which are incorporated by reference herein.

BACKGROUND OF THE INVENTION

The present invention relates to a data recording/reproducing apparatus and a data recording/reproducing method for use with a randomly accessible recording medium, as well as a computer program and a recording medium for data recording and reproduction. More particularly, the present invention relates to techniques for causing a magnetic head to scan a magnetic disc medium such as a hard disc for writing and reading data to and from the medium, with emphasis on reducing the time of access to desired data storage locations on the medium during a stable data recording/reproducing operation.

Along with technological progress in information processing, data communication and other related fields has come a growing need for reusing information that was prepared and edited in the past. Information storage technology is thus becoming more important than ever. Varieties of information recording apparatuses using diverse media including magnetic tapes and magnetic discs have been developed and have come into general use today.

Of these apparatuses, the hard disc drive (HDD) is an auxiliary storage apparatus utilizing the magnetic recording method. An HDD unit incorporates a number of magnetic discs which constitute recording media and which are rotated at high speed by a motor. A coat of magnetic material such as iron oxide and chrome-cobalt alloy is plated or laminated over the media. In operation, the magnetic head is moved radially over the rotating media to scan their surface in order to magnetize the media suitably for writing or reading data to or from the media.

Hard disc drives have gained widespread use. Illustratively, the HDD is used as a standard external storage device for personal computers. The HDD stores the operating system (OS) necessary for starting up the computer, has various application programs installed thereon, and retains files that have been created and edited. Normally, the HDD is connected to the computer through a standardized interface such as IDE (Integrated Drive Electronics) or SCSI (Small Computer System Interface); the storage space of the HDD is managed by a file system, which is a subsystem of the operating system such as FAT (File Allocation Table).

Today, the hard disc drive is getting larger than ever in capacity. The enhanced capacity is enabling the HDD to serve not only as a conventional auxiliary storage device for computers but also as a hard disc recorder for accumulating audio-visual (AD) content that has been broadcast and received. This and more new applications are envisaged for the HDD. The apparatus is thus beginning to be used for recording diverse kinds of content.

Consideration will now be given to how the hard disc is physically formatted and how data are written and read to and from the hard disc where the hard disc drive is used as an auxiliary storage device for computers.

A large number of "tracks" are formed concentrically on the hard disc as segments to which to record data. The tracks ranging from the radially outermost to the innermost zones of the disc are numbered in ascending order starting with 0. The larger the number of tracks formed on the disc surface, the larger the storage capacity of the medium.

Each of the tracks is divided into "sectors" each serving as a recording unit. Data are written to and read from the disc usually in increments of sectors. While the sector size varies from one medium to another, each sector on the hard disc is generally fixed to a size of 512 bytes. In view of the efficiency in using the media, the number of sectors per track is made larger the closer the track is to the outermost zone of the disc because each track has a larger circumference than its immediately adjacent inner track. This scheme is called zone bit recording.

Where the zone bit recording scheme is adopted, the recording density of each of the tracks is averaged. One disadvantage of this scheme is that the data transfer rate turns out uneven from one track to another. The data transfer rate gets lower over tracks that are located closer to the innermost zone of the disc.

In the case of a hard disc drive in which a plurality of media are stacked concentrically, the tracks with the same track number on the media may be regarded as located cylindrically. In that sense, these tracks are collectively called a cylinder. Each cylinder is assigned the same number as that of the tracks constituting it. The cylinders ranging from the radially outermost to the innermost zones of the disc are numbered in ascending order starting with 0. A plurality of magnetic heads located between the stacked media in inserted fashion are moved collectively between cylinders.

So-called CHS mode is one way of having a target sector addressed. This is a method for gaining access to desired data by addressing PBA (physical block address) in terms of C (cylinder), H (head) and S (sector), in that order.

Under the CHS scheme, the computer acting as the host to the hard disc drive has a limit on addressable CHS parameters. The hard disc drive getting larger in capacity can no longer be dealt with by the CHS mode for lack of addressing capacity. In order to bypass this bottleneck, what is known as LBA (logical block address) mode is adopted. This mode involves expressing the cylinder number, head number, and sector number (CHS) by use of logical serial numbers called LBA starting from 0.

On conventional hard disc drives, the magnetic head starts scanning the media in an operation called a "seek" before reaching the track containing the target sector. When the track is reached, the magnetic head waits for the media to rotate during a period called a "rotational delay" until the target sector comes immediately under the magnetic head.

With the capacity of hard discs getting larger all the time, the track density is getting higher and the width of each track narrower. This means that the magnetic head must be positioned with high precision in order to write and read data precisely to and from sectors on the disc. The magnetic head is always positioned to the track center using the technique known as servo. The servo technique involves having "servo pattern" signals written beforehand to each track at fixed intervals. These signals are later read by the magnetic head so as to determine whether the magnetic head is accurately in the track center. In the stage of HDD fabrication, the servo patterns are written to the tracks on the hard disc in a highly accurate manner. Servo areas made up of the written servo patterns illustratively include a head-positioning signal, a cylinder number, a head number, and a servo number each.

Many conventional hard disc drives have interfaces such as IDE and SCSI for connecting with their host computer. The computer controls the disc drive using a command set defined by the interface in use. Basically, LBA designating a first sector and the number of sectors to be accessed therefrom are addressed. In turn, the hard disc drive gains access to the designated first sector. The HDD proceeds with its access operation by generating a look-ahead sequence for predicting the subsequent sectors to be accessed.

The look-ahead operation is based on the assumption that sectors having consecutive addresses are assigned to successive data. Generally, the sectors having consecutive addresses exist in conjunction with successive head numbers or track numbers. Where large quantities of data are written successively on the media, the look-ahead operation is effectively performed while the data are being read.

Where storage areas are so fragmented that large data are dispersed in small pieces over multiple locations, the look-ahead operation is ineffective because the operation points to discontinuous data. This phenomenon occurs partly because the hard disc drive has no grasp of the structure of files handled by the host (i.e., computer) that requests reading and writing of data.

If the prediction fails due to a new access request from the host, the disc drive seeks the track containing the sector where the requested data are located. With the tracking completed, the disc drive waits for the disc to turn until the target sector can be accessed. This is how seek time and rotational delay occur.

The look-ahead data are preserved as long as data buffer capacity is not exhausted. If the prediction fails continuously or intermittently, the old data in the data buffer are discarded in order of storage. Seek cannot be initiated while a look-ahead operation is being performed.

That is, there are time losses due to seek time, rotational delay, and seeks getting initiated by look-ahead operations which turn out to be ineffective, as well as data losses caused by the ineffective look-ahead operations.

In order to minimize seek time and rotational delay, conventional disc drives increase their disc revolutions. This measure is taken because of the difficulty in adopting an optimal access method since there is no regularity in the quantities and structures of data handled by the host (e.g., computers). However, raising the disc revolutions is disadvantageous in terms of power dissipation and storage capacity.

Many conventional external storage systems such as hard disc drives correct errors on a sector-by-sector basis (one sector is generally made up of 512 bytes). This feature is effective against random errors occurring within each sector but not against random errors exceeding the intra-sector correctable range or against burst errors. The latter types of errors have been dealt with conventionally by retry operations that keep read errors below a predetermined level.

Such retry operations, however, require waiting for the disc to make another turn for rereading the target data, which prolongs the data read time. For example, a system handling AV content may run into a situation requiring high-speed data transfers for high-definition image reproduction or special-effects playback. In such a case, uncorrectable errors within a sector cannot be retried for correction due to time constraints. Given the state of the art today, the reproducing process must be allowed to proceed without error correction. This has often resulted in reduced levels of image reproduction quality.

Japanese Patent Laid-open No. 2000-278645 discloses techniques for providing data blocks destined for recording with information indicative of their importance so that important data blocks will be retried for error correction if necessary while the other data blocks are excluded from retry operations. The techniques are shown to be used changeably between the two categories of data blocks.

Japanese Patent Laid-open No. 2000-276856 discloses techniques for providing data blocks destined for recording with information representative of their importance so that important data blocks will have an enhanced capability to be corrected for error while the other data blocks are given normal capability for error correction. The techniques are also used changeably between the two categories of data blocks.

The techniques above function more or less satisfactorily with systems handing AV content. However, there is a need for more effective techniques for averting retries and correcting errors.

Before being shipped from their factory, hard disc drives are assigned addresses so that certain sectors deemed faulty on the disc will not be accessed. The spots carrying these sectors are called slips. On any given track, several or dozens of designated sectors may be "slipped". If a substantial number of sectors (e.g., dozens of sectors) are slipped per track, that translates into a considerable reduction in the effective per-track area of data sectors. This has a detrimental effect on data transfer rates.

If vibrations or other external disturbances take place while AV content is being retrieved from the medium, more errors tend to occur than if such disturbances were nonexistent. This means that there are more data which cannot be corrected for errors, so that reproduction quality is worsened.

In particular, if errors occur under external disturbances, more errors tend to occur intermittently in a sector segment flanked by servo areas located radially on the hard disc. These errors may be random errors or burst errors. In any case, the greater the magnitude of the external disturbance, the larger the number of sectors within which random errors cannot be corrected.

SUMMARY OF THE INVENTION

The present invention relates to a data recording/reproducing apparatus and a data recording/reproducing method for use with a randomly accessible recording medium, as well as a computer program and a recording medium for data recording and reproduction. More particularly, the present invention relates to techniques for causing a magnetic head to scan a magnetic disc medium such as a hard disc for writing and reading data to and from the medium, with emphasis on reducing the time of access to desired data storage locations on the medium during a stable data recording/reproducing operation.

The present invention provides in an embodiment a data recording/reproducing apparatus, a data recording/reproducing method, a computer program, and a storage medium for reducing the time for access to desired data locations in storage space.

The present invention provides in an embodiment a data recording/reproducing apparatus, a data recording/reproducing method, a computer program, and a storage medium for reproducing data stably without reducing data transfer rates.

The present invention provides in an embodiment a data recording/reproducing apparatus, a data recording/reproducing method, a computer program, and a storage medium for reproducing data stably by enabling the correction of random errors and burst errors in an appreciably wider range than before thus averting retries so as to minimize reductions in data transfer rates, and by reducing drops in the transfer rate upon occurrence of slips over the disc.

In carrying out the invention and according to an embodiment thereof, there is provided a data recording/reproducing apparatus for use with a disc recording medium having a plurality of either concentric or spiral tracks formed thereon, each of the tracks being divided into a plurality of sectors, the data recording/reproducing apparatus including: a seeking element for seeking a target track; a data accessing element for accessing data on the target track reached by the seek; and an error correcting element for correcting error in the data based on an error correction code generated by the error correcting element for error correction purposes. The error correcting element establishes a first error correction code increment per predetermined data quantity, establishes a second error correction code increment for a plurality of first error correction code increments depending on information about status on the disc recording medium, and forms error correction blocks each constituted by a plurality of the first error correction code increments and by the second error correction code increment added to the first error correction code increments.

Preferably, the error correcting element may establish the second error correction code increment depending on whether there exit slips of a predetermined length over those tracks on the disc recording medium which record the predetermined data quantity.

The error correcting element may preferably generate the error correction code using a Reed-Solomon code method.

The error correction block formed by the error correcting element may preferably have an interleave structure in the second error correction code increment.

The error correcting element may preferably form the error correction block in such a manner that two or more error correction blocks will not exist per track and that the error correction block will be complete either per track or per multiple track count.

The data accessing element may preferably access data on the target track reached by the seeking element, the access being started from the first accessible sector of the target track and continued over the entire track.

In the case above, the data accessing element during a write access operation may preferably assign relative location addresses successively to the sectors of the target track starting from the sector from which the access is started, and the data accessing element during a read access operation may preferably rearrange the data read from the sectors of the target track in accordance with the relative location addresses so as to reconstitute the written data.

The error correcting element may preferably handle the information about the slips in increments of sectors.

The error correcting element may preferably change structurally the second error correction code increment if the slips occur in predetermined increments of sectors over those tracks on the disc recording medium which record the predetermined data quantity.

The error correcting element may preferably change any one of a component sector count, a parity sector count, and an interleave structure when changing structurally the second error correction code increment being established.

The error correcting element may preferably change structurally the error correction block on the disc recording medium.

If the disc recording medium is formed by a zone bit recording method whereby the number of sectors on each track is varied depending on the radial track location, the error correcting element may preferably change structurally the error correction block in keeping with zones on the disc.

The error correcting element may preferably establish structurally the second error correction code increment for the track where slips exist, depending on the zone of the disc recording medium, regardless of the zone of the disc recording medium, or using a fixed value.

According to an embodiment of the invention, there is provided a data recording/reproducing method for use with a disc recording medium having a plurality of either concentric or spiral tracks formed thereon, each of the tracks being divided into a plurality of sectors, the data recording/reproducing method including the steps of: seeking a target track; accessing data on the target track reached in the seeking step; and correcting error in the data based on an error correction code generated in the error correcting step for error correction purposes. The error correcting step establishes a first error correction code increment per predetermined data quantity, establishes a second error correction code increment for a plurality of first error correction code increments depending on information about status on the disc recording medium, and forms error correction blocks each constituted by a plurality of the first error correction code increments and by the second error correction code increment added to the first error correction code increments.

Preferably, the error correcting step may establish the second error correction code increment depending on whether there exit slips longer than a predetermined length over those tracks on the disc recording medium which record the predetermined data quantity.

The error correcting step may preferably generate the error correction code using a Reed-Solomon code method.

The error correction block formed in the error correcting step may preferably have an interleave structure in the second error correction code increment.

The error correcting step may preferably form the error correction block in such a manner that two or more error correction blocks will not exist per track and that the error correction block will be complete either per track or per multiple track count.

The data accessing step may preferably access data on the target track reached in the seeking step, the access being started from the first accessible sector of the target track and continued over the entire track.

In the case above, the data accessing step during a write access operation may preferably assign relative location addresses successively to the sectors of the target track starting from the sector from which the access is started, and the data accessing step during a read access operation may preferably rearrange the data read from the sectors of the target track in accordance with the relative location addresses so as to reconstitute the written data.

According to an embodiment of the invention, there is provided a program described in a computer-readable format for use by a computer system for executing a data recording/reproducing process on a disc recording medium having a plurality of either concentric or spiral tracks formed thereon, each of the tracks being divided into a plurality of sectors, the program causing the computer system to carry out the steps of the data recording/reproducing method according to the second aspect of the invention.

According to an embodiment of the invention, there is provided a recording medium having a first error correction code increment established per predetermined data quantity, a second error correction code increment established for a plurality of first error correction code increments, and an error correction block formed with a plurality of the first error correction code increments and with the second error correction code increment added to the first error correction code increments. The second error correction code increment is structured in the error correction block, depending on information about status on each of a plurality of recording tracks formed either concentrically or spirally, and data having the structure of the error correction block are recorded to each of the recording tracks.

The inventive structures described above are designed to achieve the foregoing and other objects of this invention. That is, random errors within each sector can be corrected using the first error correction code increment (C1). Errors exceeding the intra-sector correctable range as well as burst errors stretching across multiple sectors can be corrected using the second error correction code increment (C2). With the error correction block formed by C1+C2, if the system is barred from making retries for correcting errors using C1 alone in order to keep the data transfer rate above a predetermined level, then the system can resort to C2 for error correction. This ensures more stable system performance. When random errors and burst errors are corrected over a significantly wider range of the disc than before, the retry operation is averted so that the transfer rate is kept high and data reproduction is stabilized. When the second error correction code increment (C2) is structurally changed in keeping with how slips are occurring on the disc, the system can avoid executing error correction at different levels of competency depending on slip status.

The data accessing element gains access to the first accessible sector of the target track reached by the seeking element and continues the access operation over the entire track. Illustratively, the magnetic head first reaches the target track and, starting from the sector where the magnetic head is positioned on the track, continuously accesses the entire track. When access is executed on a track-by-track basis as described, the starting of seeks is timed reliably without recourse to the unpredictable look-ahead processing.

In particular, the data accessing element during a write access operation may assign relative location addresses successively to the sectors of the target track starting from the sector from which the access is started, and the data accessing element during a read access operation may rearrange the data read from the sectors of the target track in accordance with the relative location addresses so as to reconstitute the written data. The ability to access the track starting from any one of its sectors makes it possible to start writing and reading data to and from any location where the magnetic head is positioned immediately after the seek over the disc. This eliminates rotational delay. As a result, the number of seeks is minimized and access time is shortened.

The read/write-requesting party (e.g., host device such as the computer connected to the hard disc drive) need not become aware of sector addresses on the disc. By utilizing the relative location addressing scheme requiring small data sizes, the host device can make more effective use of storage areas.

During the read access operation, the data read from the sectors of the target track are rearranged in accordance with their relative location addresses illustratively in a buffer memory. This allows the original data to be reconstituted regardless of the location of the sector from which the access was started. In that case, it is preferable to form error correction blocks in such a manner that two or more error correction blocks do not exist per track and that the error correction block is complete either per track or per multiple track count. Especially, it is preferred that in the error correction block, the second error correction code increment be established in keeping with slip-related information. This feature is provided preferably to make the performance of error correction uniform with regard to slip status.

According to an embodiment of the invention, there is provided a data recording/reproducing apparatus for use with a disc recording medium having a plurality of either concentric or spiral tracks formed thereon, each of the tracks being divided into a plurality of sectors, the data recording/reproducing apparatus including: a seeking element for seeking a target track; a data accessing element for accessing data on the target track reached by the seek; and an error correcting element for correcting error in the data based on an error correction code generated by the error correcting element for error correction purposes. The error correcting element establishes a first error correction code increment per predetermined data quantity, establishes a second error correction code increment for a plurality of first error correction code increments depending on servo areas established on the tracks formed on the disc recording medium, and forms error correction blocks each constituted by a plurality of the first error correction code increments and by the second error correction code increment added to the first error correction code increments.

Preferably, the error correcting element may establish the second error correction code increment depending on the number of the first error correction increments in a segment flanked by two of the servo areas on the tracks.

The error correcting element may preferably establish the second error correction code increment depending on an integral multiple of the number of the first error correction increments in the segment flanked by two of the servo areas on the tracks, and/or on a redundancy rate of the second error correction code increment in the error correction block.

The error correcting element may preferably establish the number of sectors each including the second error correction code, on the basis of the number of sectors constituting the first error correction code increment in the segment flanked by two of the servo areas on the tracks.

The disc recording medium may preferably be formed so that the servo areas are located radially on the disc.

The error correcting element may preferably generate the error correction code using a Reed-Solomon code method.

The error correction block formed by the error correcting element may preferably have an interleave structure in either the first or the second error correction code increment.

The data accessing element may preferably access data on the target track reached by the seeking element, the access being started from the first accessible sector of the target track and continued over the entire track.

In the case above, the data accessing element during a write access operation may preferably assign relative location addresses successively to the sectors of the target track starting from the sector from which the access is started, and the data accessing element during a read access operation may preferably rearrange the data read from the sectors of the target track in accordance with the relative location addresses so as to reconstitute the written data.

The error correcting element may preferably establish the second error correction code increment depending on the number of the servo areas along the target track and on the number of the first error correction code increments along the target track.

The error correcting element may preferably form the error correction block in such a manner that two or more error correction blocks will not exist per track and that the error correction block will be complete either per track or per multiple track count.

The error correcting element may preferably change structurally the error correction block on the disc recording medium.

The disc recording medium may preferably be formed by a zone bit recording method so that the number of sectors per track varies with radial locations on the disc.

The error correcting element may preferably form the error correction block in a different structure per zone on the disc recording medium. In this case, the error correcting element may change structurally the error correction block in accordance with zone change information.

The error correcting element may preferably fix structurally the error correction block regardless of the zone on the disc recording medium.

According to an embodiment of the invention, there is provided a data recording/reproducing method for use with a disc recording medium having a plurality of either concentric or spiral tracks formed thereon, each of the tracks being divided into a plurality of sectors, the data recording/reproducing method comprising the steps of: seeking a target track; accessing data on the target track reached in the seeking step; and correcting error in the data based on an error correction code generated in the error correcting step for error correction purposes; wherein the error correcting step establishes a first error correction code increment per predetermined data quantity, establishes a second error correction code increment for a plurality of first error correction code increments depending on servo areas established on the tracks formed on the disc recording medium, and forms error correction blocks each constituted by a plurality of the first error correction code increments and by the second error correction code increment added to the first error correction code increments.

The error correcting step may preferably establish the second error correction code on the basis of the number of the first error correction code increments in the segment flanked by two of the servo areas on the tracks.

The error correcting step may preferably generate the error correction code using a Reed-Solomon code method.

The error correction block formed in the error correcting step may preferably have an interleave structure in either the first or the second error correction code increment.

The data accessing step may preferably access data on the target track reached in the seeking step, the access being started from the first accessible sector of the target track and continued over the entire track.

In the case above, the data accessing step during a write access operation may preferably assign relative location addresses successively to the sectors of the target track starting from the sector from which the access is started, and the data accessing step during a read access operation may preferably rearrange the data read from the sectors of the target track in accordance with the relative location addresses so as to reconstitute the written data.

The error correcting step may preferably establish the second error correction code increment depending on the number of the servo areas along the target track and on the number of the first error correction code increments along the target track.

The error correcting step may preferably form the error correction block in such a manner that two or more error correction blocks will not exist per track and that the error correction block will be complete either per track or per multiple track count.

According to an embodiment aspect of the invention, there is provided a program described in a computer-readable format for use by a computer system for executing a data recording/reproducing process on a disc recording medium having a plurality of either concentric or spiral tracks formed thereon, each of the tracks being divided into a plurality of sectors, the program causing the computer system to carry out the steps of the data recording/reproducing method according to the sixth aspect of the invention.

According to an embodiment of the invention, there is provided a recording medium having a first error correction code increment established per predetermined data quantity, a second error correction code increment established for a plurality of first error correction code increments, and an error correction block formed with a plurality of the first error correction code increments and with the second error correction code increment added to the first error correction code increments. In the error correction block, the second error correction code increment is structured depending on servo areas established on each of a plurality of recording tracks formed either concentrically or spirally, and data having the structure of the error correction block are recorded to each of the recording tracks.

The inventive structures described above are designed to achieve further objects of this invention. That is, random errors within each sector can be corrected using the first error correction code increment (C1). Errors exceeding the intra-sector correctable range as well as burst errors stretching across multiple sectors can be corrected using the second error correction code increment (C2). With the error correction block formed by C1+C2, if the system is barred from making retries for correcting errors using C1 alone in order to keep the data transfer rate above a predetermined level, then the system can resort to C2 for error correction. This ensures more stable system performance. When random errors and burst errors are corrected over a significantly wider range of the disc than before, the retry operation is averted so that the transfer rate is kept high and data reproduction is stabilized.

The second error correction code increment (C2) is structurally changed depending on servo area settings over the tracks, i.e., in keeping with the number of servo areas, the number of sectors (first error correction code increments), and the number of the first error correction code increments between two of the servo areas, along the target track. That is, the second error correction code can be established by taking into consideration any errors that may be caused by external disturbances between any two servo areas (servo frame). With the error correction block established on the basis of the servo area settings along the track, the error correction code increments are used effectively and their redundancy is reduced.

When the second error correction code increment is established in accordance with the servo area settings in each zone on the disc, it is possible for the system to make its error correction performance uniform all over the disc. The arrangement also makes it possible to implement a more efficient disc format than before.

The data accessing element gains access to the first accessible sector of the target track reached by the seeking element and continues the access operation over the entire track. Illustratively, the magnetic head first reaches the target track and, starting from the sector where the magnetic head is positioned on the track, continuously accesses the entire track. When access is executed on a track-by-track basis as described, the starting of seeks is timed reliably without recourse to the unpredictable look-ahead processing.

In particular, the data accessing element during a write access operation may assign relative location addresses successively to the sectors of the target track starting from the sector from which the access is started, and the data accessing element during a read access operation may rearrange the data read from the sectors of the target track in accordance with the relative location addresses so as to reconstitute the written data. The ability to access the track starting from any one of its sectors makes it possible to start writing and reading data to and from any location where the magnetic head is positioned immediately after the seek over the disc. This eliminates rotational delay. As a result, the number of seeks is minimized and access time is shortened.

The read/write-requesting party (e.g., host device such as the computer connected to the hard disc drive) need not become aware of sector addresses on the disc. By utilizing the relative location addressing scheme requiring small data sizes, the host device can make more effective use of storage areas.

During the read access operation, the data read from the sectors of the target track are rearranged in accordance with their relative location addresses illustratively in a buffer memory. This allows the original data to be reconstituted regardless of the location of the sector from which the access was started. In that case, it is preferable to form error correction blocks in such a manner that two or more error correction blocks do not exist per track and that the error correction block is complete either per track or per multiple track count.

Additional features and advantages of the present invention are described in, and will be apparent from, the following Detailed Description of the Invention and the figures.

BRIEF DESCRIPTION OF THE FIGURES

FIGS. 4A and 4B are explanatory views of error-correctable ranges for use by the first embodiment.

FIG. 5 is an explanatory view of a translation table for access by the first embodiment.

FIG. 11 is another explanatory view of the interleave structure for use by the first embodiment.

FIG. 19 is a flowchart of steps for setting sectors in a variable ECC block with the second or the third embodiment in use.

FIGS. 20A and 20B are explanatory views of sector structures for use by the second and the third embodiments.

FIG. 21 is an explanatory view of a translation table for access by the second and the third embodiments.

DETAILED DESCRIPTION OF THE INVENTION

The present invention relates to a data recording/reproducing apparatus and a data recording/reproducing method for use with a randomly accessible recording medium, as well as a computer program and a recording medium for data recording and reproduction. More particularly, the present invention relates to techniques for causing a magnetic head to scan a magnetic disc medium such as a hard disc for writing and reading data to and from the medium, with emphasis on reducing the time of access to desired data storage locations on the medium during a stable data recording/reproducing operation.

1. First Embodiment

Figure 1:
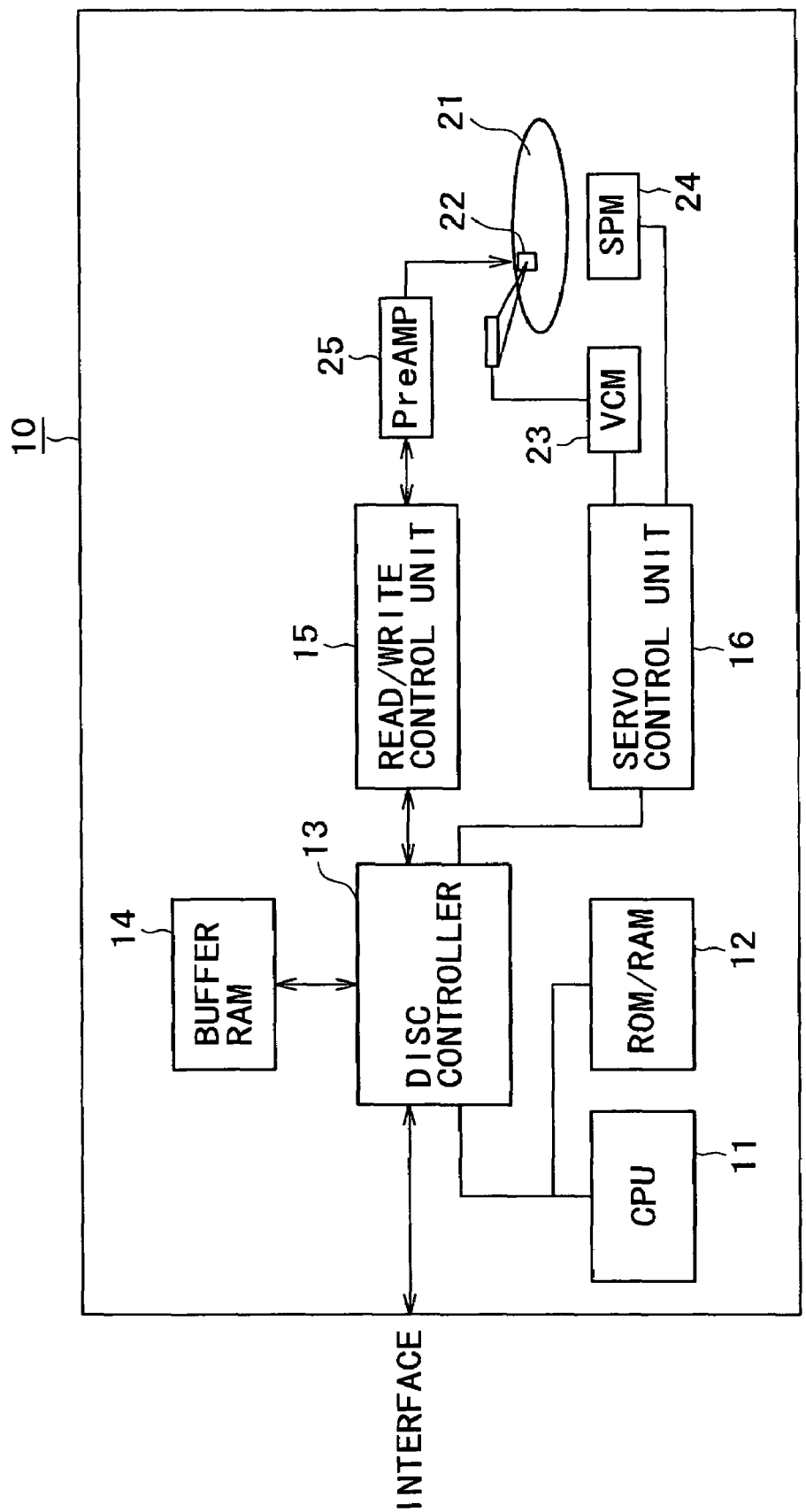
FIG. 1 is a block diagram showing an overall structure of a hard disc drive practiced as a first and a second embodiment of this invention.

The first embodiment of this invention will now be described with reference to the accompanying drawings and under the following headings:
1-1. Structure of the Hard Disc Drive
1-2. Access Operations
1-3. ECC Structure
1-4. Processing According to Slip Status
1-1. Structure of the Hard Disc Drive FIG. 1 schematically shows an overall structure of a hard disc drive (HDD) 10 practiced as the first embodiment of this invention. As illustrated, the HDD 10 includes a CPU (central processing unit) 11, a ROM (read only memory)/RAM (random access memory) 12, a disc controller 13, a buffer RAM 14, a data read/write control unit 15, a servo control unit 16, and a magnetic disc 21.

The CPU 11 provides overall control over the internal workings of the drive 10 by executing control codes held in the ROM/RAM 12. The disc controller 13 receives commands from a host (not shown) connected to the drive 10 via an interface 17. The CPU 11 processes the commands. In keeping with the results of the command processing, the disc controller 13 gives hardware operation instructions to the data read/write control unit 15 and servo control unit 16. Write data received from the host through the interface 17 or data retrieved from the magnetic disc 21 for transfer to the host are held temporarily in the buffer RAM 14.

The data read/write control unit 15 performs code modulation to generate data patterns to be actually written to the magnetic disc 21 and causes a preamplifier 25 to write the data to the disc 21. Read data are received from the magnetic disc 21 through the preamplifier 25 for data demodulation.

The servo control unit 16 synchronously drives a voice coil motor (VCM) 23 and a spindle motor (SPM) 24 to position a magnetic head 22 to within a predetermined range of a target track. The voice coil motor 23 moves an arm carrying the magnetic head 22, and the spindle motor 24 rotates the magnetic disc 21. The servo control unit 16 further causes the magnetic head 22 to seek given locations in accordance with the above-mentioned servo pattern on the disc.

On the magnetic disc 21, a large number of tracks each serving as a circular area for accommodating data are formed concentrically. For example, the outermost track on the disc 21 is assigned a track number 0, the second inner track a track number 1, the third inner track a track number 2, and so on. Each track is divided into sectors each serving as the smallest increment for data read/write operations. Each sector illustratively has a fixed data length of 512 bytes. In practice, the sectors accommodate header information and error correction codes in addition to data.

The so-called zone bit recording (ZBR) scheme is adopted whereby the number of sectors per track is made larger the farther the track from the disc center. That is, the number of sectors varies from one track to another over the entire disc surface. The magnetic disc 21 is radially divided into a plurality of zones in such a manner that each zone has the same number of sectors.

Although not shown, the disc drive unit may contain a plurality of magnetic discs (called platters) stacked concentrically. In this makeup, the tracks having the same track number on each of the magnetic discs are arranged cylindrically. These tracks are designated using a cylinder number which is identical to the corresponding track number.

Figure 3:
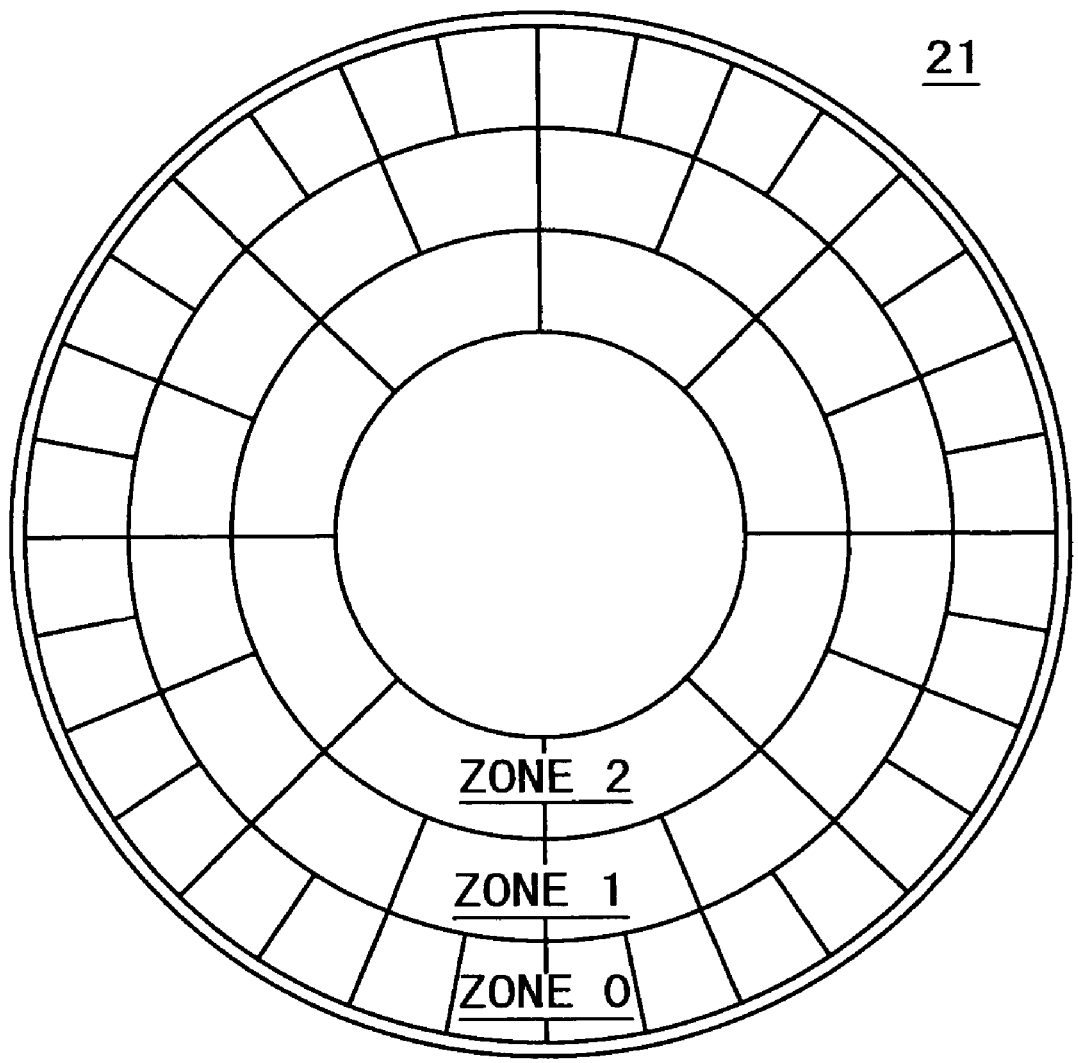
FIG. 3 is an explanatory view depicting schematically a disc format structure for use by the first and the second embodiments.

FIG. 3 shows an example of the ZBR scheme. In this example, the disc is divided into three zones numbered 0, 1 and 2 from the outermost zone inward. Each zone contains a plurality of tracks. In FIG. 3, each zone is divided into sectors. In this particular case, zone 0 is constituted by 32 sectors, zone 1 by 16 sectors and zone 2 by 8 sectors. When a specific sector count is changed from one zone to another, the revolutions of the spindle motor 24 are kept constant while the clock for read and write operations is varied in such a manner that track recording density is held within a predetermined range, whereby the storage capacity per disc is maximized.

Figure 2:
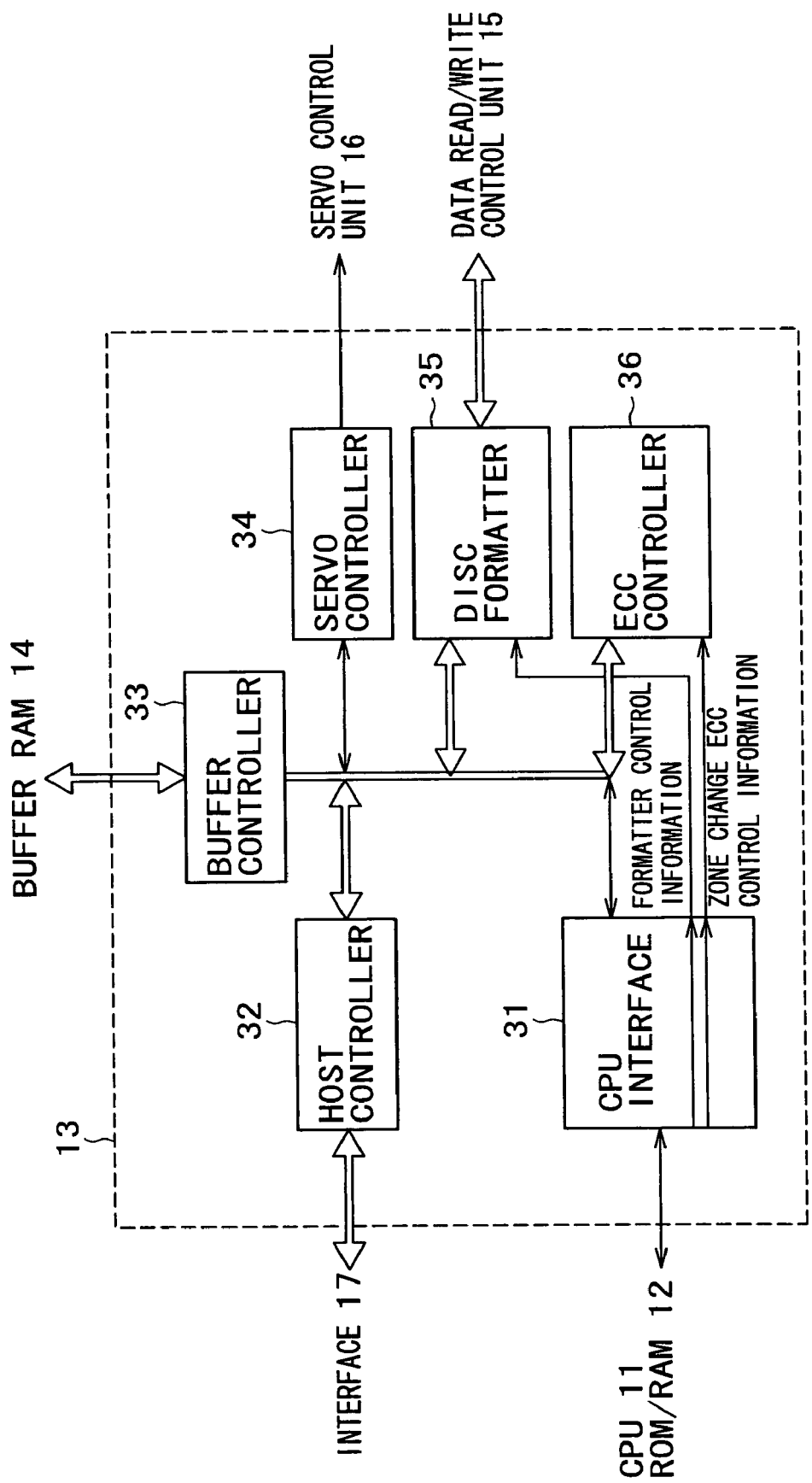
FIG. 2 is a block diagram of a disc controller for the hard disc drive practiced as the first and the second embodiments.

FIG. 2 shows a more detailed internal structure of the disc controller 13 included in FIG. 1. As illustrated, the disc controller 13 includes a CPU interface 31, a host controller 32, a buffer controller 33, a servo controller 34, a disc formatter 35, and an ECC controller 36. In FIG. 2, arrowed double lines indicate data movements.

The CPU interface 31 interfaces between the CPU 11 and the RAM/ROM 12. As such, the CPU interface 31 notifies the disc controller 13 of any commands coming from the host and receives the results of command processing from the CPU 11. The host controller 32 communicates with the host through the interface 17. The buffer controller 33 controls data exchanges between the buffer RAM 14 on the one hand and the components of the disc controller 13 on the other hand. The serve controller 34 controls the operations of the VCM (voice coil motor) 23 and SPM (spindle motor) 24 to read servo information from the servo pattern on the magnetic disc 21. The servo information thus retrieved is transferred to the servo control unit 15.

The disc formatter 35 provides control in a manner writing data from the buffer RAM 14 to the magnetic disc 21 or reading data from the disc 21. The ECC controller 36 adds ECC (error correction codes) to data when writing data from the buffer RAM 14 to the disc or corrects errors in the data when they are retrieved from the disc.

The hard disc drive 10 practiced as the first embodiment of this invention is structured as described above. As will be discussed later, this embodiment constitutes a system that provides data access control for eliminating rotational delays in order to shorten access time and boost data transfer rate. By rendering random errors and burst errors correctable over a wide range, the first embodiment averts retry operations so as to minimize drops in transfer rate. Upon occurrence of slips over the disc, this embodiment takes measures to reduce declines in transfer rate so as to ensure stable data reproduction.

1-2. Access Operations

The HDD 10 practiced as the first embodiment of this invention accesses the entire target track starting from the sector on which the magnetic head 22 has reached the track. The sectors on each track have no fixed sector numbers; they are addressed as relative locations. The relative location scheme allows each track to be accessed starting from any one of its sectors. That is, access to the disc is accomplished on a track-by-track basis, so that there is no need for the unpredictable look-ahead processing. This makes it possible to determine exactly when to start seek operations. Because each track can be accessed starting from any one of its sectors, rotational delays are eliminated. As a result, the number of seeks to be done is minimized and the access time involved is shortened.

To write data to a given track involves assigning a relative location address to the sector from which the track in question starts getting accessed. To read data from a given track involves first reaching one of its sectors from which to start accessing the entire track. The retrieved data are placed into the buffer RAM 14 on the basis of the relative location address of the sector. The data read operation may be started from any one of the sectors making up the target track.

The operations above are made possible by resorting to sector formats shown in FIGS. 4A and 4B. One typical sector format, illustrated in FIG. 4A, is made up of a relative location data field, a data field, and an ECC field. The relative location data field represents the relative location of this sector on the track in question, and the ECC field is used for error correction over the entire area of this sector. These three fields constitute both an error-correctable range and a recordable range. Because the relative location data are included as a header in the error-correctable range, the relative location data can be restored by correcting random errors that may occur within the sector. This allows disc access operations to proceed smoothly. Generally, each sector has its sector address written in its ID field not as an absolute location but as a relative location. That means the ID field can be reduced in size, allowing the data field to be that much larger to accommodate more data, whereby storage space can be utilized more effectively.

In a data write operation onto a given track, a relative location is assigned to the sector from which the track in question starts getting accessed. ECC data are generated on the basis of the relative location and write data. The relative location is recorded to the relative location field, the write data to the data field, and the ECC data to the ECC field. Rotational delays do not occur because the write data start getting recorded to the sector from which access to the track of interest is initiated.

In a data read operation on a given track, reading of data is started from the sector from which access to the track is initiated. Where to store the retrieved data in the buffer RAM 14 is determined on the basis of the location of the sector acquired from its relative location field. Thus even if data start getting read from any one of the sectors constituting the target track, the retrieved data are rearranged in the buffer RAM 14 in accordance with their relative locations so that the data from the track are reconstituted in the original sequence. Rotational delays do not occur as well because the target data start getting read from the sector on which access to the track of interest is started.

FIG. 4B shows another typical sector format for use by the HDD 10 practiced as the first embodiment of this invention, the format being used on the tracks of the magnetic disc 21. In this case, as in the case above, each sector is made up of a relative location data field, a data field, and an ECC field. The three fields form an error-correctable range. The relative location data field represents the relative location of this sector on the track in question, and the ECC field is used for error correction over the entire area of this sector. Unlike the example of FIG. 4A, however, the relative location data field is not included in the recordable range. The absence of the relative location data field increases correspondingly the size of a field usable for accommodating data within the sector, whereby storage space can be utilized more effectively.

That being the case, in a data write operation onto a given track, a relative location is assigned to the sector from which the track in question starts getting accessed. ECC data are generated on the basis of the relative location and write data. Only the write data and ECC data are recorded to the sector in question. Rotational delays do not occur because the write data start getting recorded to the sector from which access to the track of interest is initiated.

In a data read operation on a given track, reading of data is started from the sector from which access to the track is initiated, and any error that may have occurred is corrected using ECC. This permits reconstitution of that relative location of the sector which was not written to the sector in question. Where to store the retrieved data in the buffer RAM 14 is determined on the basis of this relative location. Thus even if data start getting read from any one of the sectors constituting the target track, the retrieved data are reconstituted in the buffer RAM 14 in the original sequence. Rotational delays do not occur as well because the target data start getting read from the sector on which access to the track of interest is started.

With the above-described sector formats in use, how the host communicates with the HDD 10 upon data write and read operations will now be described. The HDD 10 embodying this invention works as described below when writing data in response to a command from the host connected via the interface 17.

The host first issues a data write command to the HDD 10. In a response to the host, the HDD 10 designates an address area that will involve a minimum seek time in view of the current access sequence. Given the response from the HDD 10, the host transfers data content that will fit the size of the designated address area (in byte count, sector count, etc.). The HDD 10 receives the data content and writes what is received on a track-by-track basis.

As described above, the sectors of the track to which to write data are assigned relative location information relative to the access starting location on the track in question. This arrangement frees the host 50, upon requesting a data write operation, from having to become aware of a specific write destination in terms of cylinder numbers, head numbers or sector numbers; there is no need for the host 50 to designate these numbers. Illustratively, the address area may be reported from the HDD 10 to the host simply in terms of a content number for identifying the content that the host requests the HDD 10 to write. The HDD 10, for its part, prepares a translation table associating each content number with corresponding physical recording locations on the disc 21. With the first embodiment, the disc 21 is accessed on a track-by-track basis, so that the translation table is prepared illustratively as shown in FIG. 5. In the table, content numbers are associated with corresponding track numbers and head numbers.

It should be noted that no sector numbers under the CHS scheme are included in the translation table. The sectors making up the target track to which to write data are assigned relative location information relative to the access starting sector of the track in question. In this makeup, the data read from the track can be reconstituted on the basis of the relative location information on each sector regardless of the sector on which access to the track was initiated for data retrieval. This eliminates the need for designating an access starting sector in the translation table.

The translation table is written to the buffer RAM 14. The writing of the table to the RAM 14 is carried out when write data are received from the host 50, under control by software executed by the disc controller 13 or by the CPU 11.

When the HDD 10 of this embodiment reads data in response to a command from the host connected through the interface 17, communications take place as follows: the host first issues a data read command to the HDD 10. The data read command has a target content number designated therein. Given the content number, the HDD 10 selects accordingly the target tracks from the translation table of FIG. 5 and causes the magnetic head 22 to do seeks. The HDD 10 transfers to the host the data retrieved from the disc 21 in accordance with the address area sequence designated in an earlier data write operation. When making a data read request, the host need only designate a relevant content number. There is no need for the host to become aware of specific write locations (PBA) in terms of cylinder numbers, head numbers or sector numbers.

As described above, the HDD 10 accesses the entire track starting from the sector on which the magnetic head 22 reached the track in question. Since access to the disc is carried out on a track-by-track basis, when to do seeks is determined reliably without recourse to the unpredictable look-ahead processing. Each track can be accessed starting from any one of its sectors. This makes it possible to start writing and reading data to and from any location where the magnetic head is positioned immediately after the seek over the disc. With rotational delays thus eliminated, the number of seeks is minimized and access time is shortened.

The disc access operation described above is implemented by the disc controller 13 giving suitable hardware operation instructions to the data read/write control unit 15 and servo control unit 16 in response to the results of command processing by the CPU 11.

1-3. ECC Structure

As discussed above, the HDD 10 of this embodiment accesses the disc in increments of tracks. In this case, it is appropriate to form an ECC block on a track-by-track basis on the magnetic disc 21.

Figure 6:
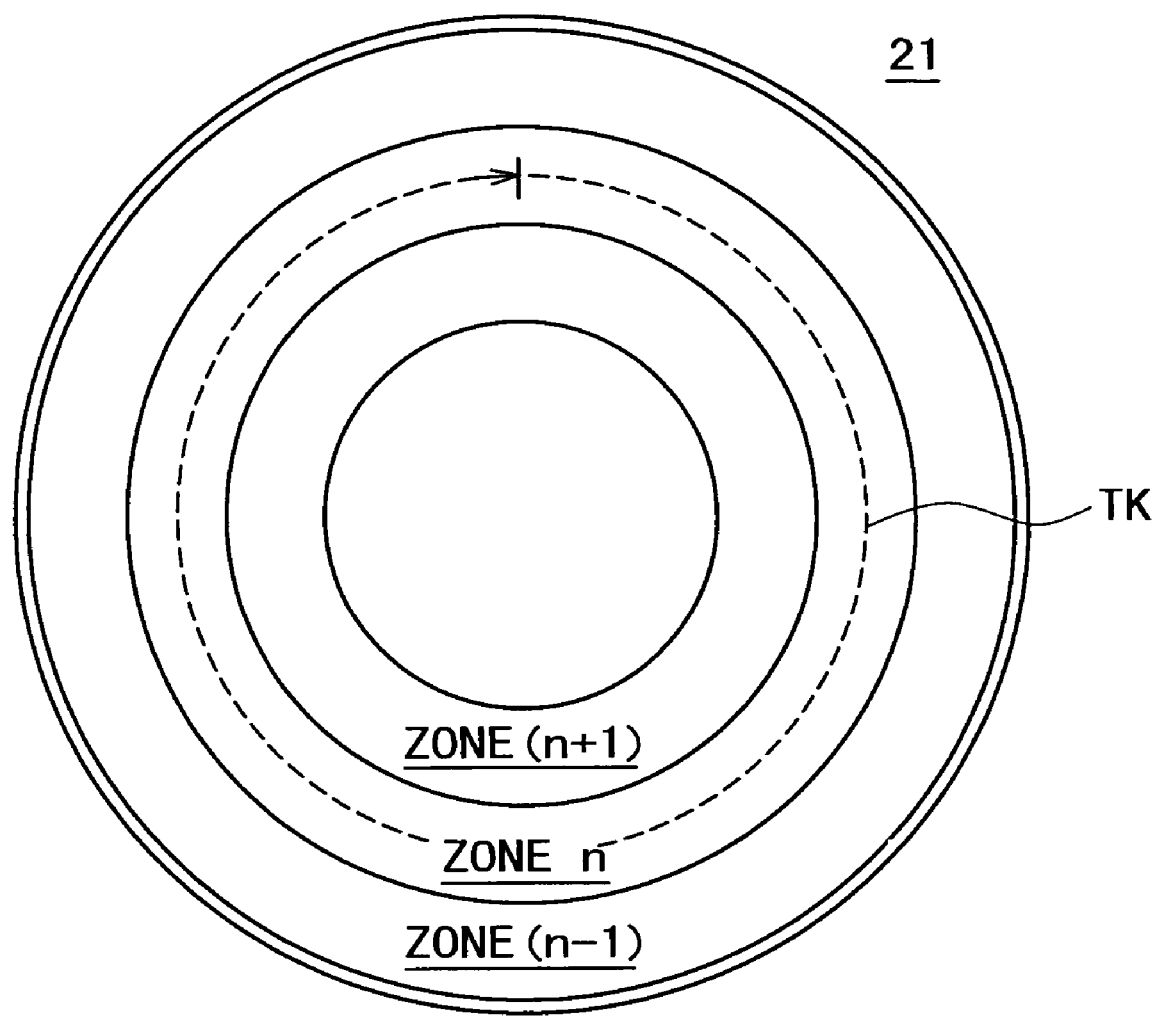
FIG. 6 is an explanatory view of an ECC block formed per track for use by the first embodiment.

FIG. 6 shows a typical ECC structure. In the example of FIG. 6, the magnetic disc 21 is divided into zones. Of these zones, a zone "n" is shown having an ECC block structure. Specifically, a broken line in the zone "n" indicates a track TK constituting in its entirety an ECC block increment, which applies to each of the other tracks as well. The ECC block contains an ECC increment called C1 for intra-sector error correction and an ECC increment called C2 for sector-to-sector error correction. The combination of C1 and C2 makes up an error correction increment (ECC block structure increment) provided per track. Two or more ECC block structure increments cannot exist within each track.

Over an integral number of tracks (e.g., three tracks), a single ECC block may illustratively be formed by the combination of C1 and C2.

Figure 9:
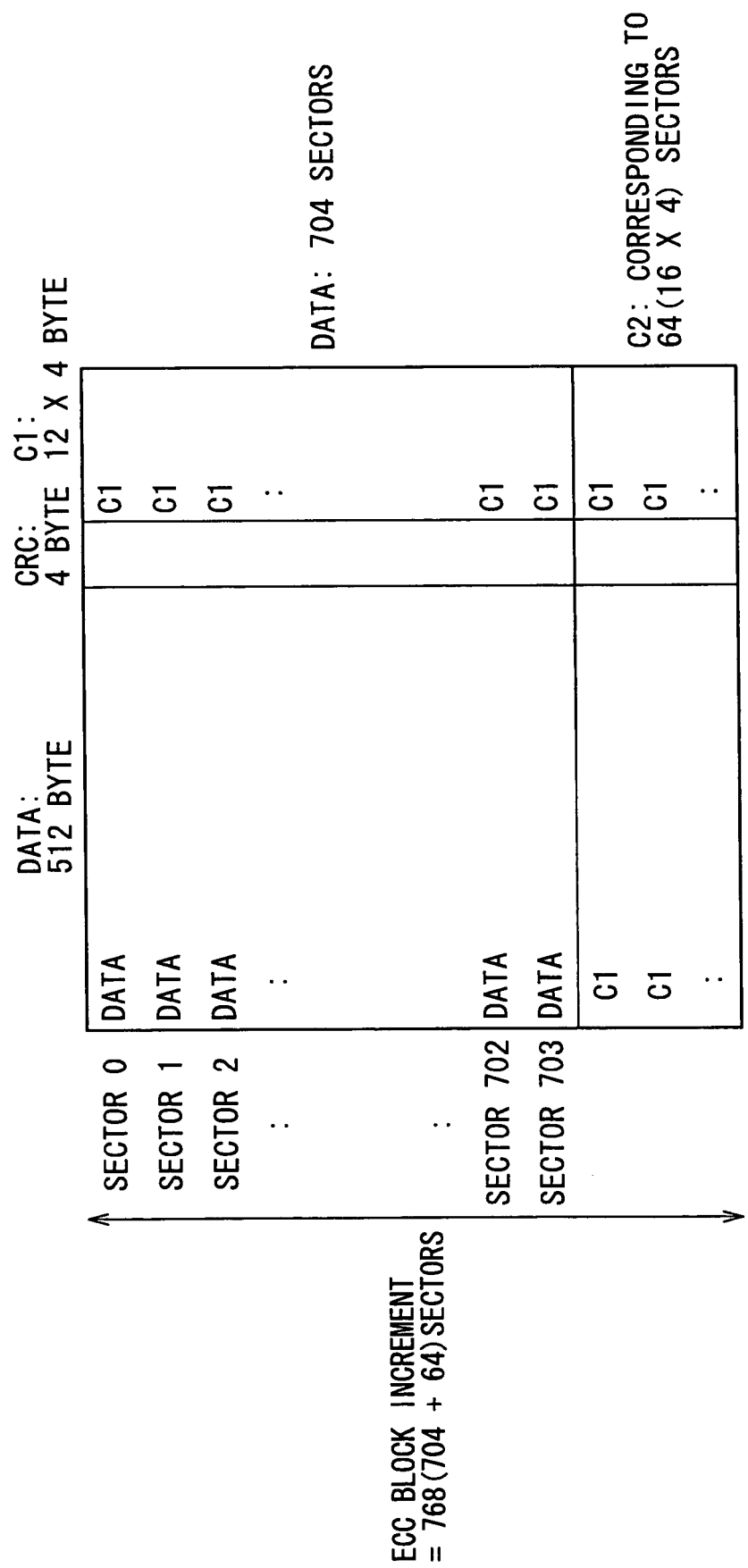
FIG. 9 is an explanatory view of an ECC block structure for use by the first embodiment.

FIG. 9 shows a typical ECC block structure on the magnetic disc 21 that adopts the ECC block structure indicated in FIG. 6. In the example of FIG. 9, a Reed-Solomon code with a symbol length of eight is used as ECC. It is assumed here that the number of effective sectors per track is 768 in a given zone of a magnetic disc. One sector is illustratively formed by 512-byte data supplemented with four-byte CRC (cross check code) and 48-byte C1 in a four-interleave structure.

In the ECC block structure of FIG. 9, 704 sectors ranging from sector 0 to sector 703 are provided as a data field, and 64 sectors from sector 704 through sector 767 are furnished as a C2 field. The C2 field is illustratively made up of four interleaves for every 16 sectors. In this structure, one ECC block has a total of 768 sectors. Within this zone, these sectors constitute an entire track.

The error correction performance with this embodiment is examined below. Random errors are corrected using C1 for up to 24 bytes per sector (or for up to 48 bytes if byte drop-out information is available). Burst errors are corrected using C2 for up to 32 sectors per track (or for up to 64 sectors if the result of CRC is utilized).

The error correction block structure above is adopted primarily for the following reasons: many conventional HDD systems correct errors on a sector-by-sector basis, each sector being composed of 512-byte data and an information bit. That means the HDD can correct random errors that may occur within each sector but cannot correct those random errors in excess of the correctable range as well as burst errors, i.e., errors that continue across sector boundaries.

In such cases, retry operations are carried out conventionally to keep the level of read errors under a predetermined level for error correction. However, each retry operation is basically equivalent to another access pass on the same track. This amounts to an extra access time. Whereas access time is shortened using the track-by-track access scheme, retry operations lead to increases in access time resulting ultimately in delays in data reading.

Illustratively, where AV content is handled for high-definition (HD) picture reproduction, special-effects playback, or other actions that require high data transfer rates, there may occur uncorrectable read errors that cannot be handled in time by retry operations. In such cases, the read errors are left uncorrected given the present state of the art. As a result, the quality of image reproduction is worsened.

Under these circumstances, the first embodiment of this invention utilizes the above-described ECC structure for stable data reproduction. The structure allows the embodiment to minimize cases in which retry-inducing errors cannot be corrected. According to the invention, the conventional error correction scheme using C1 for intra-sector error correction is supplemented with C2 for sector-to-sector error correction. The structure is such that an error correction increment (i.e., ECC block) made up of C1 and C2 is complete per track. As mentioned above, the ECC block increment is basically brought about on a track-by-track basis.

In the example above, the ECC block increment made up of C1 and C2 is complete per track, and access to the disc is performed on a track-by-track basis. This makes it possible to implement data access control without incurring rotational delays. That is, the time to access desired data storage locations is shortened. Because two or more ECC blocks do not exist on the same track, data access control is brought about without rotational delays even if the ECC structure spans a plurality of tracks.

Described below are the internal workings of the disc controller 13 in effect upon error correction. The disc controller 13 receives formatter control information and zone change ECC control information from the CPU 11. The formatter control information is about formatting of the disc accessed in increments of tracks, whereby each track is accessed for the entire track length starting from the sector on which the track in question is first reached by a seek. This information is sent through the CPU interface 31 to the disc formatter 35 that provides disc formatting.

The zone change ECC control information is used for establishing the ECC structure that is complete per track. When zones are changed, the number of sectors per track is changed. This in turn causes the ECC structure to change. This information is sent through the CPU interface 31 to the ECC controller 36 that establishes the ECC structure accordingly. The buffer RAM 14 is then accessed so that predetermined ECC processing will be carried out.

Figure 10:
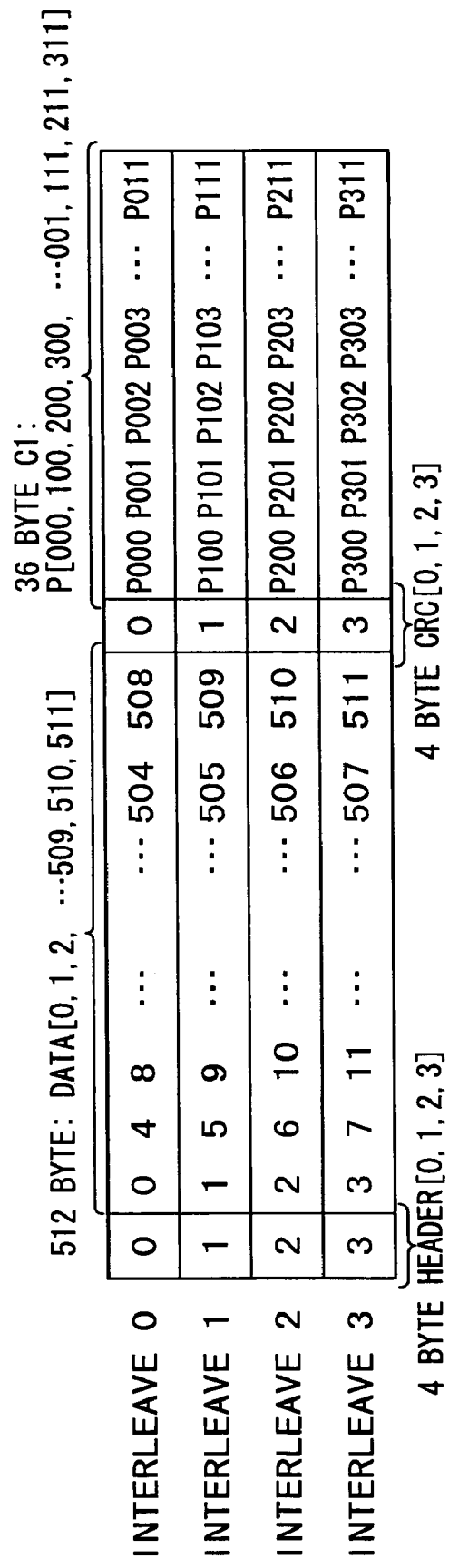
FIG. 10 is an explanatory view of an interleave structure for use by the first embodiment.

Although no mention was made above of interleaves in connection with the example of FIG. 9, it is necessary to apply the interleave scheme to the 512-byte data field where the Reed-Solomon code with the symbol length of eight is in use. FIGS. 10 and 11 show cases in which interleaves are applied to the ECC block structure for the first embodiment of this invention.

In FIGS. 10 and 11, interleaves are shown applied to a sector "n" that is divided into a four-byte header, 512-byte data, and four-byte CRC. These sector parts are added up for each sector, and the sum is divided into four portions each supplemented with 12-byte ECC C1. Illustratively, interleave 0 is constituted by supplementing a one-byte header, 128-byte data, and one-byte CRC with 12-byte parity data each. The same applies to interleaves 1, 2 and 3.

Inside the sector, the interleaves 0, 1, 2 and 3 are arranged in a cyclically repeated manner, in that order. The four-byte header comes first, followed by 512-byte data, four-byte CRC, and the C1 code generated as described above. FIG. 10 shows a breakdown of the interleave-based structure. FIG. 11 depicts how addresses 0 through 567 are allocated in memory space.

In this manner, what is shown in FIGS. 10 and 11 is the same sector-by-sector increment depicted in FIG. 9. That is, a four-byte header, 512-byte data, four-byte CRC, and 48-byte ECC C1 are added up to form a single sector. These parts are the major components of each of the sectors on the magnetic disc 21 to which to record data. Actual pieces of write data are each supplemented further with a preamble, a sync signal part, and a postamble. Alternatively, the disc may be formatted into increments of sectors without recourse to header files or CRC.

The interleave structure above can be determined primarily on a hardware basis. Where the Reed-Solomon code with the symbol length of eight is in use, the interleave structure in the C1 direction (i.e., in the sector direction) is applied illustratively as shown in FIG. 10.

The interleaves above may also be applied to C2 with which error correction is carried out between sectors. In that case, the notation "bytes" in the data part in FIG. 10 may be read as "sectors" for deploying interleaves in the C2 direction (i.e., perpendicular to the sectors). This also makes it possible to implement the same structure and function as those above using the interleaves.

Although one sector was shown to be made up of 512-byte data in the example above, this is not limitative of the invention. Alternatively, if one sector is composed of 1,024 bytes or 2,048 bytes of data, the ECC block structure can still be implemented both for each sector and across sectors in the same manner as described above.

Where the ECC block above is arranged to be complete per track, it may happen that the performance of error correction varies significantly between zones over the magnetic disc 21. That is because the number of sectors per track differs from one zone to another while the ECC parity count structure remains the same. This snag is circumvented by making the ECC block structure variable from one zone to another so that the redundancy rate of ECC is kept within a predetermined range. This renders the error correction performance uniform all over the disc surface.

Figure 13:
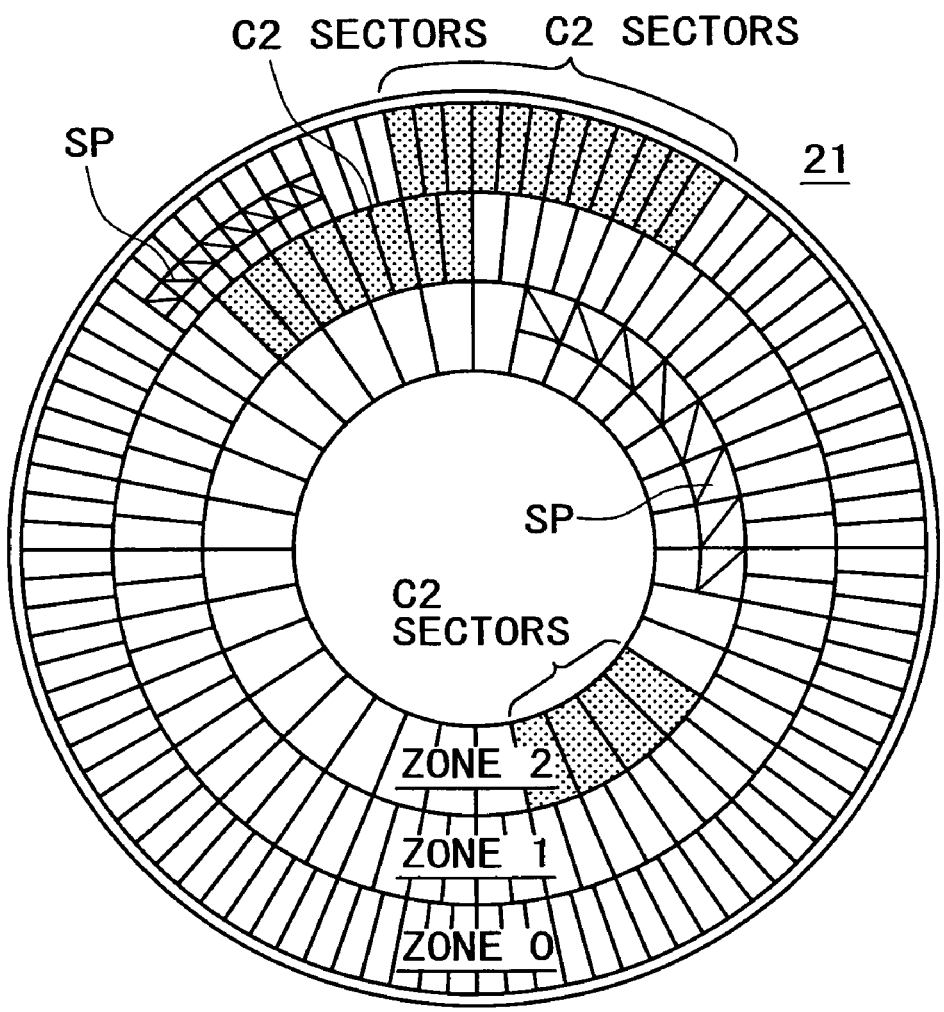
FIG. 13 is an explanatory view showing how slips occur in particular zones.

FIG. 13 schematically shows a typical disc format in effect when the ECC block is varied depending on the zone. In FIG. 13, the magnetic disc 21 is divided into zones with a different sector count per track each. In this schematic example, the number of sectors per track is 96 in zone 0, 64 in zone 1, and 32 in zone 2. The number of revolutions is held constant for each zone but the operation clock is varied from one zone to another, so that the track recording density per zone is kept within a predetermined range.

In the ECC structure above, each sector is provided with C1. It is assumed that the C1 structure is fixed and unchanged as shown in FIG. 9. In the C2 structure, as illustrated, 12 sectors are assigned to the zone 0, eight sectors to the zone 1, and four sectors to the zone 2 as C2 parity each. With this structure, the ratio of the number of C2 parity sectors to the number of data sectors per track remains constant from one zone to another. The performance of C2-based error correction is also made the same for each zone.

In the actual format, it is relatively rare for the ratio of the number of parity sectors to that of data sectors per track to be an integer number as shown in FIG. 13. The ECC block structure may then be varied from one zone to another so that the ECC redundancy rate is kept within a predetermined range.

As described, the ECC block is made to be complete per track in the C1 plus C2 structure, supplemented with interleaves. Furthermore, the ECC structure is varied from one zone to another in order to keep the redundancy rate of the ECC part within a predetermined range. This makes it possible to correct random errors and burst errors occurring more extensively than before over the entire disc surface, whereby stable data reproduction is implemented.

In the examples above, the C1 part of the ECC structure was shown fixed and the C2 part variable so as to hold the redundancy rate of the ECC part, i.e., error correction performance, to a predetermined range. Alternatively, the C1 part may be varied from one zone to another and the C2 part fixed to hold the error correction performance to a predetermined level. As another alternative, The C1 and C2 parts may be controlled integrally to keep the error correction performance within a predetermined range.

1-4. Processing According to Slip Status

The basics of the ECC block structure are as discussed above. With the first embodiment of this invention, the ECC block structure is established depending on slips occurring on the tracks of the magnetic disc 21.

Figure 12:
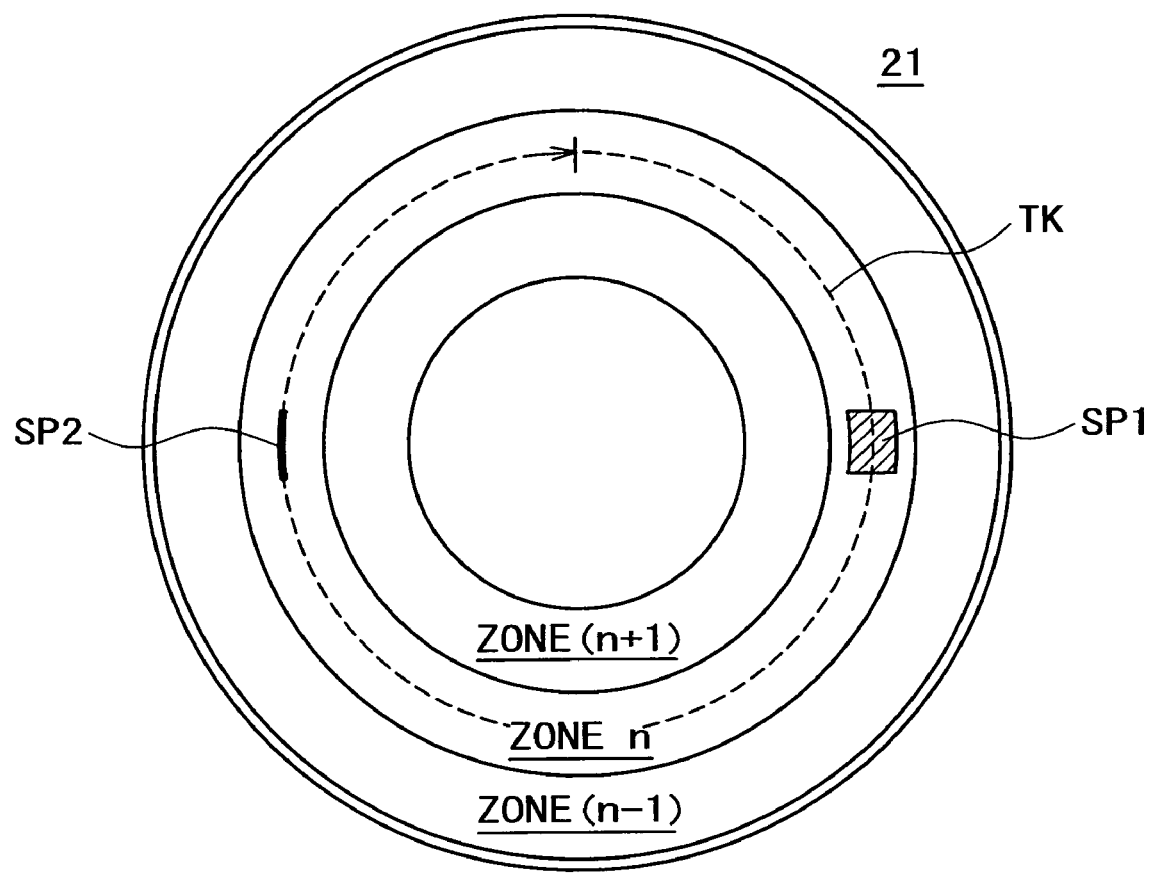
FIG. 12 is an explanatory view illustrating how slips occur in an ECC block with the first embodiment in use.

FIG. 12 schematically shows how slips typically occur within tracks. On a track TK which in its entirety constitutes an ECC block increment in a zone "n", two slips (SP1 and SP2) are shown taking place. Slips occur in a number of ways. In one example, the slip SP2 exists over a plurality of sectors only on the track TK. In another example, the slip SP1 takes place in a given physical area where a plurality of contiguous tracks exist over contiguous multiple sectors. In a further example, not shown, slips may occur in a very small number of sectors (e.g., a single sector).

If the ECC block structure on the tracks in the zone "n" is assumed to be the same as that in FIG. 9, then the number of effective sectors for the entire track TK is 768. One sector is illustratively formed by 512-byte data supplemented with four-byte CRC (cross check code) and 48-byte C1 in a four-interleave structure. As many as 704 sectors ranging from sector 0 to sector 703 are provided as a data field, and 64 sectors from sector 704 through sector 767 are furnished as a C2 field. The C2 field is illustratively made up of four interleaves for every 16 sectors.

Suppose that for each of the slips SP1 and SP2 in FIG. 12, 48 sectors are set aside each as contiguous sectors that are slipped. In that case, the track TK indicated by broken line on the zone "n" has 672 effective sectors, with two slipped portions of the sectors subtracted from 768 sectors.

Given the basic ECC block structure discussed above, the number of C2 sectors is fixed at least per track in each zone. That is, if the C2 sector count per track in the zone "n" is 64, then the C2 sector count is also 64 on the track TK where the slips have occurred. On a track with no slips, the number of effective sectors is 768. Subtracting 64 sectors of the C2 part from these 768 sectors provides a data field of 704 sectors. However, because the track TK with the slips SP1 and SP2 has 672 effective sectors as mentioned above, the data field of the track TK is made up of only 608 sectors (i.e., 64 subtracted from 672).

Different tracks have thus different data sector counts in the same zone. This means that differences occur in data redundancy between the tracks and that the amount of transferred data during the same time period can vary from one track to another. On the one hand, if slipped sectors are very few (e.g., one sector), the differences in data redundancy between tracks or in the amount of transferred data per unit time are comparatively small. On the other hand, if a large number of sectors are slipped (e.g., 48 sectors), then the effects on data redundancy or on the amount of transferred data per unit time (i.e., data transfer rate) are not negligible.

With this embodiment, every predetermined number of tracks are provided with information about the presence or absence of slips. When a given number of tracks have slips, the C2 sector count in the ECC block structure for the zone containing the tracks is changed. This measure reduces the differences in data redundancy and improves the data transfer rate.

Each track on the magnetic disc 21 is assigned slips upon examination during the fabrication process. Slip information is stored into a predetermined storage area illustratively inside the disc controller 13. This information is recorded during the fabrication process, so that the HDD 10 may later verify the slip sector count on each track as needed. Ways to establish the slipped areas (e.g., in terms of sector count) vary from one manufacturer to another. Some manufacturers establish as slipped areas those sectors corresponding to a fixed area surrounding a defective spot; others set aside predetermined sectors of the track in question as slipped sectors. For example, a group of 48 sectors may be established as slips surrounding a faulty spot that has been detected.

Figure 14:
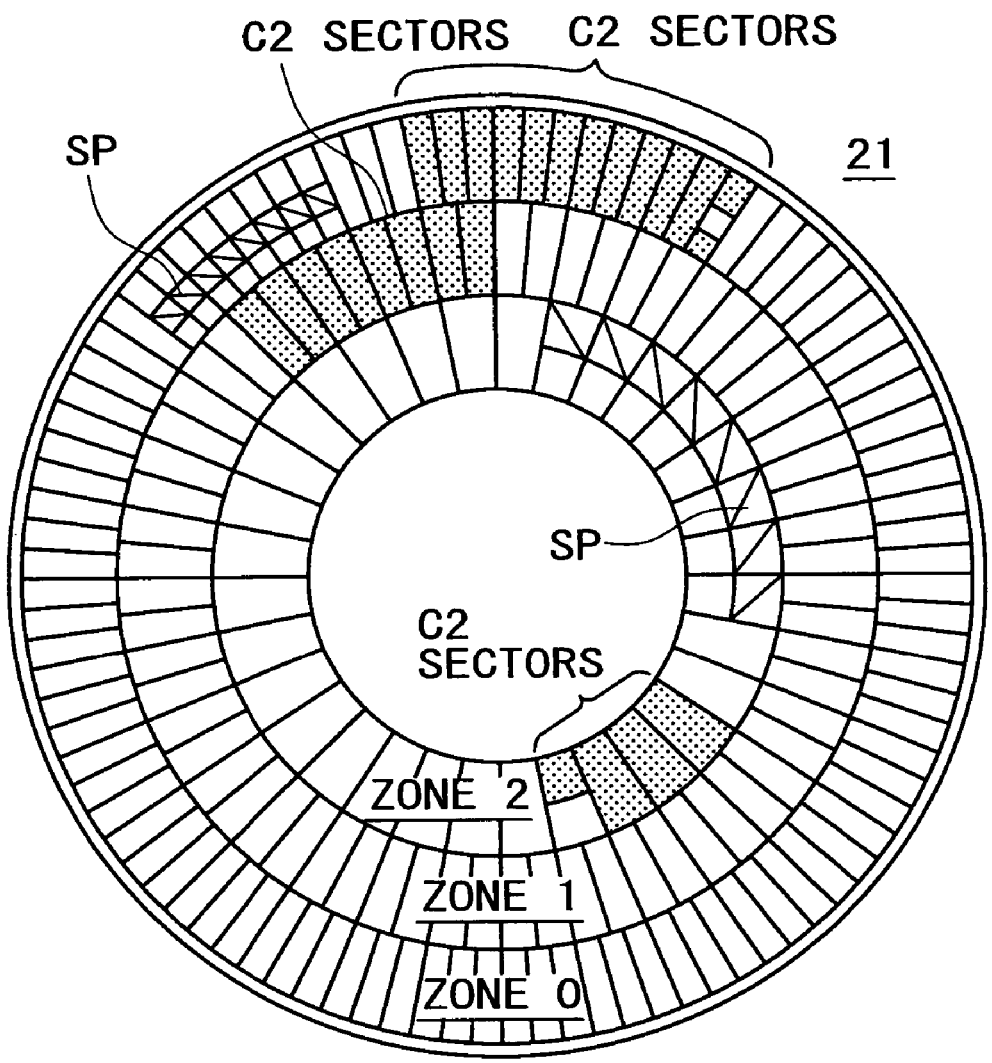
FIG. 14 is an explanatory view indicating C2 sectors in effect when slips occur in particular zones with the first embodiment in use.

Described below with reference to FIGS. 13 and 14 are specific examples of establishing an ECC block corresponding to slips. In FIGS. 13 and 14, division lines in the radial direction represent sector boundaries. FIG. 13 shows a typical ECC block structure in which the redundancy rate of C2 remains the same per predetermined track count (e.g., per track) as opposed to the per-track sector count that is changed from one zone to the next. For purpose of illustration and simplification, the number of sectors per track is 96 in the zone 0, 64 in the zone 1, and 32 in the zone 2. If the redundancy rate of C2 sectors is assumed to be 12.5 percent (=⅛), then the number of C2 sectors is 12 in the zone 0, eight in the zone 1, and four in the zone 2.

From one zone to another, the specific number of sectors is determined in such a manner that track recording density is held within a predetermined range, with the number of spindle motor (SPM) revolutions kept constant and with the read/write clock made variable. These measures are intended to boost the storage capacity per disc.

In the case above, C2 sectors are allocated per track as shown in FIG. 13. These sectors need not be in specific physical locations; they may be laid out in an arbitrary pattern as illustrated. For purpose of simplification, FIG. 13 shows an arbitrary sector layout on a zone-by-zone basis. In practice, the sectors may be laid out arbitrarily on a track-by-track basis as well. In this case, too, the number of sectors and that of C2 sectors per track are changed from one zone to another. When the current zone gives way to another zone, the number of sectors and that of C2 sectors are changed.

Suppose that a middle area of the zone 0 and an outer area of the zone 2 develop slips SP and that eight sectors are excluded for the slips per zone. In that case, in the area where the slips exist inside the zone 0, the data field is reduced to 76 sectors from 84 sectors in effect under normal conditions (96−12=84). The redundancy rate for the data goes up to 13.6 percent as opposed to 12.5 percent in areas where there are no slips (12/88=0.1363). The data transfer rate declines correspondingly.

In the outer area where slips exist within the zone 2, the data field is reduced to 20 sectors from 28 sectors in effect under normal conditions. The redundancy rate for the data rises to 16.7 percent as opposed to 12.5 percent in areas with no slips (4/24=0.1666). The data transfer rate then drops correspondingly.

As shown in FIG. 13, if the same sectors (8 sectors) are excluded from each zone for the slips, the slips occurring in inner zones lead to higher redundancy rates and lower data transfer rates.

With this embodiment, the ECC block is set in keeping with the slips that have occurred. An example of the settings is shown in FIG. 14, in which C2 redundancy is made uniform per predetermined track count (e.g., one track) with regard to the number of sectors per track which is varied from one zone to another. Any partially developed slips are set apart from the C2 sectors determined for each zone. The number of sectors per track is the same as that in the example of FIG. 13, i.e., 96 sectors in the zone 0, 64 sectors in the zone 1, and 32 sectors in the zone 2. The C2 sectors are established with a redundancy rate of 12.5 percent (=⅛), i.e., 12 C2 sectors in the zone 0, eight in the zone 1, and four in the zone 2.

In the example of FIG. 14, as in FIG. 13, slips SP are assumed to have occurred in the middle area of the zone 0 and the outer area of the zone 2. If eight sectors are set aside for the slips, the data field in the area where the slips exist is reduced to 76 sectors from 84 sectors (96−12=84) under normal conditions. In those parts where the slips have occurred (i.e., tracks including those set aside for the slips SP), the number of C2 sectors is changed. Specifically, in the zone 0, 11 sectors are established as C2 sectors on each slip-occurring track while 12 sectors are appropriated as C2 sectors on each normal track. In this case, the rate of data redundancy is held constant at 12.5 percent in both the slip-free area and the slip-occurring area (11/88=0.125).

In the outer area containing the slips SP within the zone 2, the data field has 28 sectors per normal track but only 20 sectors per slip-occurring track. For each of the slip-occurring tracks, the number of C2 sectors is changed. More specifically, four sectors are set aside as C2 sectors in the zone 0, while three sectors are established as C2 sectors for each slip-occurring track. In this case, too, the rate of data redundancy is kept constant at 12.5 percent both in the slip-free area and on each slip-occurring track (3/24=0.125).

As described, the ECC block structure is changed in each zone depending on whether the area of interest (e.g., each track) is free of slips or retains slips. This makes it possible to keep the redundancy rate constant per track in each zone. In other words, the performance of C2-based correction is kept uniform throughout the ECC block structure regardless of the occurrence of slips.

Where slips occur, the number of data sectors appreciably drops per track. In that case, the performance of C2-based correction is changed in the normal ECC block structure illustratively with this embodiment so as to lower the number of C2 sectors below a predetermined redundancy rate, whereby priority is given to the data transfer rate. The C2 sectors may then be appropriated as data sectors so that the decline in the number of data sectors per slip-occurring track is minimized. That is, the reduction in the C2 sector count is compensated by an increase in the number of data sectors, whereby the slip-induced drop in data transfer rate is minimized.

As mentioned above, slip information may be kept in a storage device inside the disc controller 13 or in some other appropriate storage unit. For example, a slip information table may be created regarding each of the tracks. This table may be referenced for specific tracks during operation. Alternatively, the slip information may be recorded to a header of each track if such headers are provided. In this setup, a slip detecting element may be furnished separately to detect slips. Any track found to carry slips is so indicated. This method eliminates the need for storing slip information per track (or in increments of ECC blocks). Each track may have C2 sectors suitably established thereon depending on the detected presence or absence of slips.

In a zone where slips exist, the number of C2 sectors is made smaller illustratively than the ordinary C2 sector count per zone, so that the rate of C2 redundancy per predetermined track count becomes equivalent to that in effect where no slips exist. In practice, however, the number of sectors may not be exactly the same per track in each zone. In this case, suitable measures need only be taken to keep the redundancy rate approximately uniform for both slip-free tracks and slip-bearing tracks.

Figure 15:
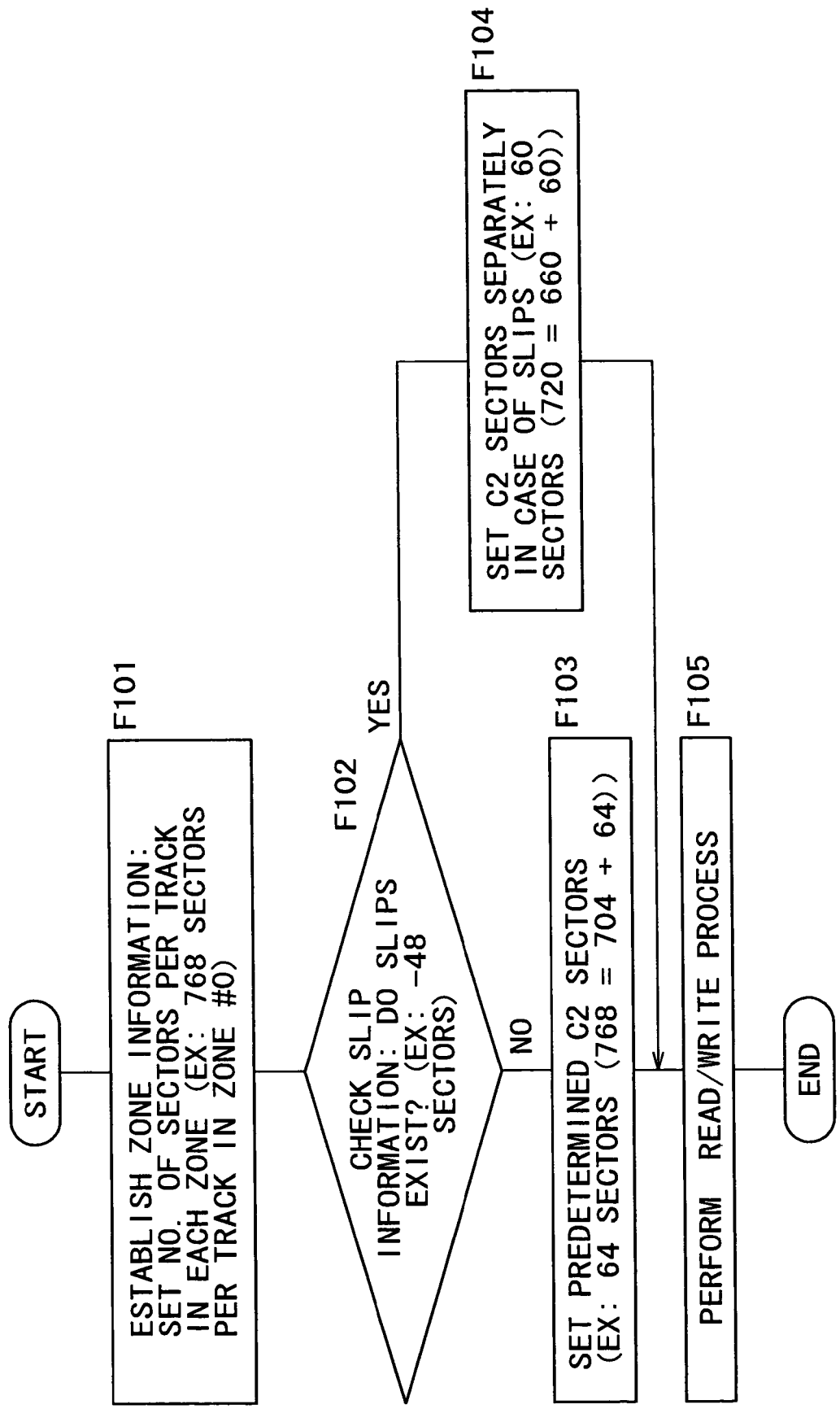
FIG. 15 is a flowchart of steps for setting C2 sectors in accordance with slip information with the first embodiment in use.

How an ECC block is set in keeping with slip status will now be described with reference to FIG. 15. The steps in FIG. 15 are carried out by the components shown in FIG. 1 centering on the CPU 11 and disc controller 13. More specifically, on a disc having ZBR recordings, the ECC block structure per predetermined track count is changed from one zone to another through the use of slip information. The steps involved are performed as follows:

In step F101, zone area information is established. Specifically, the number of sectors per track (or per predetermined track count) in each zone is set. It is assumed here that there are 768 sectors per track in the zone 0.

In step F102, a check is made to see if there exist slips on the current track to or from which data are to be written or read. The check is carried out by referencing the slip information about the track in question. In this example, slips are set aside in increments of 48 sectors. Thus every 48 sectors are examined for slips.

If there are no slips, step F103 is reached. In step S103, the normal ECC block structure is established for the zone in question. Illustratively, of the 768 sectors that exist, 704 sectors are appropriated as data sectors and 64 sectors as C2 sectors.

If slips are found to exist in step F102, then step F104 is reached. In step F104, a predetermined ECC block structure in the case of slips is established for the current zone. That is, a sector count different from the normal count for the zone is set. For example, if 48 sectors are to be excluded on a slip-occurring track, 660 sectors out of the total of 720 sectors (768–48) are established as data sectors and 64 sectors as C2 sectors.

Following the setting of the ECC block in step F103 or F104, step F105 is reached. In step F105, a write or a read operation is carried out. More specifically, a write or a read operation is performed on the basis of the C2 information and ECC block information determined as described. For the write operation, an ECC generation process is initially carried out to generate ECC block data including data sectors and C1 and C2 sectors. For the read operation, data are first read from the tracks on the magnetic disc 21, followed by an ECC-based error correction process carried out as needed in keeping with the established ECC block information.

By executing the steps above, the HDD 10 as the first embodiment of this invention proves to be a hard disc drive that is subject to less changes in redundancy rate for higher efficiency and less fluctuations in data transfer rate than before. The efficient ECC block structure described above allows the HDD 10 to operate as a more stable system capable of correcting random errors and burst errors over much wider ranges than before.

More specifically, this embodiment of the invention includes: a seeking element for seeking a target track; a data accessing element for accessing data on the target track reached by the seeking element, the access being started from the first accessible sector of the target track and continued over the entire track; and an error correcting element for correcting error in the data based on an error correction code generated by the error correcting element for error correction purposes. Random errors within each sector can be corrected using a first error correction code (C1) increment. Errors exceeding the intra-sector correctable range as well as burst errors stretching across multiple sectors can be corrected using a second error correction code (C2) increment. When the setting of the second error correction code (C2) increment is determined by use of information about slips occurring per track on the disc, it is possible to constitute error correction code increments more efficiently. This in turn permits building of a system that operates at high speed in a stable manner with less redundancy in error correction codes than before.

Although the process example of FIG. 15 shows that every 48 sectors are checked for the presence of slips, this is not limitative of the invention. On the same disc, any sectors excluded because of slips in addition to the predetermined increments of 48 sectors set aside for the slips may also be dealt with. That is, the presence or absence of slips (or the number of slip sectors to be dealt with) may be determined upon examination in view of diverse design factors, including the slip setting scheme in use, the number of sectors per zone, the level of performance required of the system, tolerable fluctuations in redundancy rate, and allowances of data transfer rate.

The predetermined number of sectors excluded for slips are allowed to occur either in one spot or in a plurality of spots per unit area. The number of sectors may or may not be limited to 48; the sector count may illustratively be 96 or 31, besides 48. In any case, the slip information may be used as the basis for reestablishing relevant C2 sectors.

Where slips occur on such a small scale (e.g., one to several sectors) that their effects are negligible on redundancy rate and data transfer rate, it is appropriate to establish C2 sectors as usual. In step F102 of FIG. 15, for example, the presence of slips may be recognized if 48 sectors or more are found to carry slips. In that case, the presence of slips lower than the 48-slip threshold is considered nonexistent, and step F103 is reached.

Where very few sectors (e.g., one or two sectors) are set aside for slips, they will not be excluded from the slip information merely because their effect on redundancy rate is limited. These sectors should be recognized as slips in the slip information. Illustratively, if ten or more one-sector slips are detected on a given track, then C2 sectors may be reestablished.

In the example of FIG. 15, a fixed number of C2 sectors (60 sectors) are provided where slips exist in a given zone. That is, if there are slips in the current zone, the number of C2 sectors is changed from 64 to 60. In other words, the C2 sector count is either 64 or 60 depending on the presence or absence of slips in the zone. When other zones are dealt with, the normal number of C2 sectors and the number of C2 sectors in case of slips are determined in accordance with the sector count for the zone in question. Alternatively, instead of having the C2 sector count set for a different fixed value in the presence of slips from one zone to another, it is possible to establish a fixed number of C2 sectors regardless of the zone. For example, the normal number of C2 sectors may be decremented by one for every slip in every zone. This arrangement is suitable for simplifying hardware structures and contributes to reducing the redundancy and transfer rate differences involved.

It is also possible to vary the number of C2 sectors on a slip-carrying track in a given zone. In the example of FIG. 15, the number of C2 sectors is always 60 on slip-occurring tracks in a given zone. In practice, the number of C2 sectors may be set in keeping with the number of slip-bearing sectors (i.e., reflecting the number of effective sectors) on each slip-carrying track. That is, the number of C2 sectors may be set in accordance with the number of effective sectors determined by the slip count, in such a manner that the ratio of the C2 sector count to the effective sector count matches a target rate of redundancy. This makes it possible to deal with diverse manners of slips occurring on tracks, whereby the rate of redundancy can be stabilized in a more detailed manner. There is no need to change the sector setting processes from one zone to another.

As another alternative, a plurality of fixed C2 sector counts may be prepared, and one of them may be selected in keeping with slip status on the tracks in a given zone. In the above example, the number of C2 sectors may be changed in stepped fashion to 64 for a slip-free track, to 60 for a slip-occurring track, or to 56 for a track where a larger number of slips have occurred.

In other variations of this invention, whereas the ECC block is shown to be set on a track-by-track basis in FIG. 6, the ECC block may also be established per multiple track count. This block structure is effective no matter where a given track is started. The number of ECC block increments per track may be determined in accordance with system requirements; there is no upper limit or lower limit to the block increment count. This feature applies regardless of the C1 structure.

Whereas the examples above assumed that two or more ECC blocks do not exist per track, this is not limitative of the invention. This invention also applies to an ECC block format in which a plurality of ECC blocks are allowed to exist on each track. In this case, the ECC block structure is established in such a manner that the presence or absence of slips is determined or the number of slip-carrying sectors is recognized over a track range constituting an ECC block. The C2 sector count may then be changed accordingly. For example, if a half-track makes up one ECC block, slip status is checked over every half-track range. The ECC block to be recorded to each half-track is then established.

There are no constraints on how to arrange C2 sectors recorded on the disc; the C2 sectors may be laid out as desired per ECC block structure. Where the second error correction code C2 is changed in structure, the number of component sectors is varied. Alternatively, the number of parity sectors as C2 sectors may be changed. As another alternative, the interleave structure may be modified.

In the examples above, the access method was shown having a relative location assigned to each sector per track. As is well known, there also exists an access method based on LBA (logical block address). The slip-handling process performed by this embodiment applies regardless of the access method in use. That is, the above-described process may be carried out in conjunction with the method of assigning relative address information to sectors per track, with the method involving track-by-track LBA assignment, or with some other method for processing in predetermined disc increments in keeping with slip status.

In the foregoing description, the ECC block structure was shown to be different from one zone to another. Alternatively, the ECC block structure may be varied in increments other than zones. For example, the same ECC structure may cover a plurality of zones (e.g., zones 1 and 2 share the same structure while zone 0 is differently structured). In another example, a single zone may contain regions of a different ECC structure each. With the first embodiment of this invention, these variable ECC block structures on the disc need only be supplemented with the slip-based settings.

The program according to this invention is a program that implements the above-described functions of the HDD 10. The inventive program is started by the CPU 11. In operation, the components of the HDD 10 are controlled by the program in a manner suitably executing the process of FIG. 15 as discussed above. The program may be held beforehand in, say, the ROM/RAM 12. Alternatively, the program may be stored on the magnetic disc 21 and loaded into the ROM/RAM 12 upon use.

Other embodiments of this invention will now be described with reference to the accompanying drawings and under the following headings:

2. Second Embodiment
2-1. Structure of the Hard Disc Drive
2-2. Servo Areas
2-3. ECC Structure
2-4. Typical Formats and Processes
3. Third Embodiment
3-1. Access Operations
3-2. ECC Structure
3-3. Typical Formats and Processes
4. Variations

2. Second Embodiment 2-1. Structure of the Hard Disc Drive

FIG. 1 schematically depicts an overall structure of a hard disc drive (HDD) 10 practiced as the second embodiment of this invention. As illustrated, the HDD 10 includes a CPU (central processing unit) 11, a ROM (read only memory)/RAM (random access memory) 12, a disc controller 13, a buffer RAM 14, a data read/write control unit 15, a servo control unit 16, and a magnetic disc 21.

The CPU 11 provides overall control over the internal workings of the drive 10 by executing control codes held in the ROM/RAM 12. The disc controller 13 receives commands from a host (not shown) connected to the drive 10 via an interface 17. The CPU 11 processes the commands. In keeping with the results of the command processing, the disc controller 13 gives hardware operation instructions to the data read/write control unit 15 and servo control unit 16. Write data received from the host through the interface 17 or data retrieved from the magnetic disc 21 for transfer to the host are held temporarily in the buffer RAM 14.

The data read/write control unit 15 performs code modulation to generate data patterns to be actually written to the magnetic disc 21 and causes a preamplifier 25 to write the data to the disc 21. Read data are received from the magnetic disc 21 through the preamplifier 25 for data demodulation.

The servo control unit 16 synchronously drives a voice coil motor (VCM) 23 and a spindle motor (SPM) 24 to position a magnetic head 22 to within a predetermined range of a target track. The voice coil motor 23 moves an arm carrying the magnetic head 22, and the spindle motor 24 rotates the magnetic disc 21. The servo control unit 16 further causes the magnetic head 22 to seek given locations in accordance with the above-mentioned servo pattern on the disc.

On the magnetic disc 21, a large number of tracks each serving as a circular area for accommodating data are formed concentrically. For example, the outermost track on the disc 21 is assigned a track number 0, the second inner track a track number 1, the third inner track a track number 2, and so on. Each track is divided into sectors each serving as the smallest increment for data read/write operations. Each sector illustratively has a fixed data length of 512 bytes. In practice, the sectors accommodate header information and error correction codes in addition to data.

The so-called zone bit recording (ZBR) scheme is adopted whereby the number of sectors per track is made larger the farther the track from the disc center. That is, the number of sectors varies from one track to another over the entire disc surface. The magnetic disc 21 is radially divided into a plurality of zones in such a manner that each zone has the same number of sectors.

Although not shown, the disc drive unit may contain a plurality of magnetic discs (called platters) stacked concentrically. In this makeup, the tracks having the same track number on each of the magnetic discs are arranged cylindrically. These tracks are designated using a cylinder number which is identical to the corresponding track number.

FIG. 3 shows an example of the ZBR scheme. In this example, the disc is divided into three zones numbered 0, 1 and 2 from the outermost zone inward. Each zone contains a plurality of tracks. In FIG. 3, each zone is divided into sectors. In this particular case, zone 0 is constituted by 32 sectors, zone 1 by 16 sectors and zone 2 by 8 sectors. When a specific sector count is changed from one zone to another, the revolutions of the spindle motor 24 are kept constant while the clock for read and write operations is varied in such a manner that track recording density is held within a predetermined range, whereby the storage capacity per disc is maximized.

FIG. 2 shows a more detailed internal structure of the disc controller 13 included in FIG. 1. As illustrated, the disc controller 13 includes a CPU interface 31, a host controller 32, a buffer controller 33, a servo controller 34, a disc formatter 35, and an ECC controller 36. In FIG. 2, arrowed double lines indicate data movements.

The CPU interface 31 interfaces between the CPU 11 and the RAM/ROM 12. As such, the CPU interface 31 notifies the disc controller 13 of any commands coming from the host and receives the results of command processing from the CPU 11. The host controller 32 communicates with the host through the interface 17. The buffer controller 33 controls data exchanges between the buffer RAM 14 on the one hand and the components of the disc controller 13 on the other hand. The serve controller 34 controls the operations of the VCM (voice coil motor) 23 and SPM (spindle motor) 24 to read servo information from the servo pattern on the magnetic disc 21. The servo information thus retrieved is transferred to the servo control unit 15.

The disc formatter 35 provides control in a manner writing data from the buffer RAM 14 to the magnetic disc 21 or reading data from the disc 21. The ECC controller 36 adds ECC (error correction codes) to data when writing data from the buffer RAM 14 to the disc or corrects errors in the data when they are retrieved from the disc.

The hard disc drive 10 practiced as the second embodiment of this invention is structured as described above. As will be discussed later, the second embodiment constitutes a system that averts retry operations so as to minimize drops in transfer rate and ensure stable data reproduction by rendering random errors and burst errors correctable over a wide range.

2-2. Servo Areas

Figure 7:
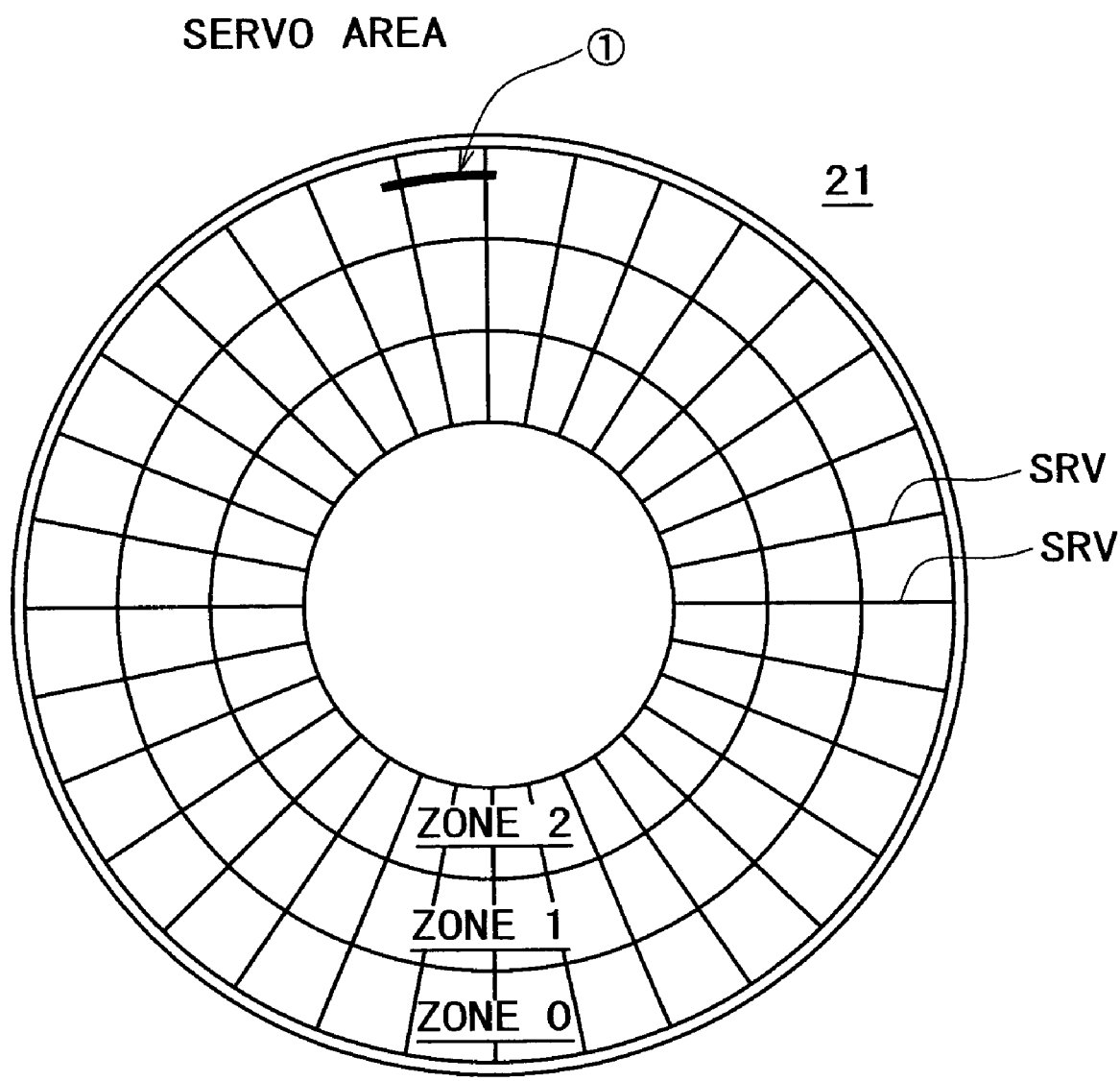
FIG. 7 is an explanatory view of servo areas for use by the second embodiment and a third embodiment of the invention.

FIG. 7 shows a typical layout of servo areas on the magnetic disc 21. In FIG. 7, solid lines in the radial direction indicate servo areas SRV (different from the sector divisions shown in FIG. 3).

In the example of FIG. 7, the servo areas are positioned in the radial direction on the magnetic disc 21, indicated by 32 radially arranged solid lines. The servo areas SRV are formed regardless of zones 0, 1 and 2 provided concentrically. That, in each zone, 32 servo areas are formed per track.

If each sector is formed by 512 bytes, then the size per sector (i.e., sector size) is smaller than the capacity between two adjacent servo areas on a track. That means there exist a plurality of sectors between any two adjacent servo areas.

The sector layout is determined primarily for each zone under the ZBR scheme. That is, the number of sectors between two adjacent servo areas differs from one zone to another.

When a specific sector count is changed from one zone to another, the revolutions of the spindle motor 24 are kept constant while the clock for read and write operations is varied in such a manner that track recording density is held within a predetermined range, whereby the storage capacity per disc is maximized.

In the example of FIG. 7, the number of servo areas is set for 32 per track. Alternatively, as many as 96 servo areas may be allocated per track. In this case, too, the servo areas are formed radially on the disc and a plurality of sectors are furnished between two adjacent servo areas. Servo zones are each determined by the number of servo areas per track, by the disc revolutions, and by the servo frequency in use, and are established in accordance with system requirements.

Figure 8A:
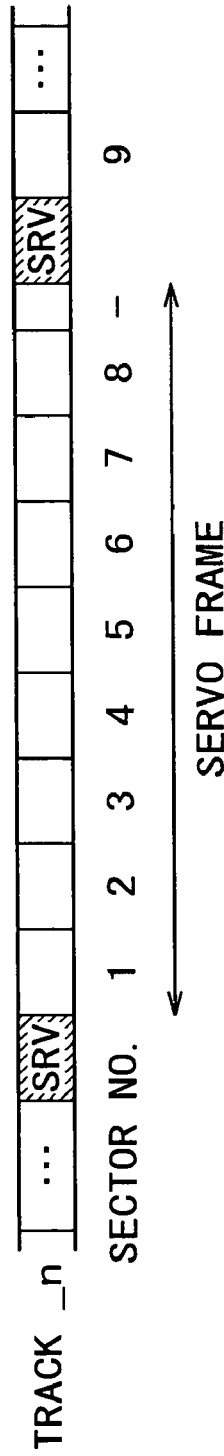
FIGS. 8A and 8B are explanatory views of servo frames for use by the second and the third embodiments.
Figure 8B:
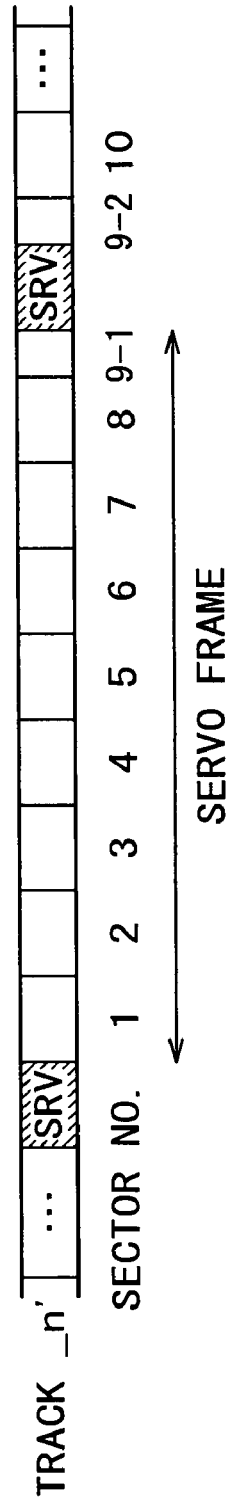

A track portion indicated by an encircled numeral 1 in FIG. 7 is located between two servo areas. A more detailed view of this portion comprised of sectors is shown in FIGS. 8A and 8B. FIG. 8A illustrates eight sectors interposed between two adjacent servo areas SRV. The portion flanked by two servo areas SRV is called a servo frame. In the example of FIG. 8A, eight sectors are allocated to form one servo frame. FIG. 8B shows 8.5 sectors interposed between two adjacent servo areas SRV (forming a servo frame).

The length of each of the sectors shown in FIGS. 8A and 8B is determined by the revolutions of the spindle motor 24 and by the clock for write and read operations. It is not mandatory for an integral number of sectors to be interposed between two adjacent servo areas SRV. A fractional sector portion may occur in each servo frame, which is typically dealt with by one of two setups. In one setup, a maximum number of whole sectors may be placed between the servo areas, with the remaining sector portion simply left unused as shown in FIG. 8A. In another setup, as shown in FIG. 8B, the remaining sector portion may be used as a fractional sector in the next servo area for higher efficiency.

The servo areas SRV are used illustratively for executing track positioning control. Specifically, the magnetic head 22 provides information as to whether the head 22 is on or off a track based on the magnetic head movement over the servo areas SRV of the track being traced. It might happen that external disturbances (e.g., vibrations) have moved the magnetic head 22 off the track. In that case, if the displacement off the track is significant, the entire servo control over the track is repeated. That is, the data read operation is halted halfway, and the relevant track is again accessed for another data read operation.

If the head is displaced within a predetermined range in the direction of contiguous tracks, the data read operation is allowed to continue under track positioning control. Because track positioning control is effected as the magnetic head passes over the servo areas, data read errors caused by track displacement occur mainly between one servo area and the next. In the case of FIG. 8A, if external vibrations displace the head position off the track within a predetermined range, read errors can increase across sectors 1 through 8. In like manner, read errors can occur across sectors 1 through 9 in the case of FIG. 8B.

Read errors that may occur within a sector can be corrected by an intra-sector error correction process if they fall within a predetermined range of bytes. If external vibrations are considerable, the displacement off the track may fall within the predetermined range but may cause more read errors than can be corrected within an intra-sector error correctable range set for the sector in question. Ultimately, all sectors between two adjacent servo areas are liable to develop errors. This can result in the continuous occurrence of sectors errors, which is one of the causes of burst errors.

2-3. ECC Structure

FIG. 9 shows a typical ECC (error correction code) block structure for this embodiment. An ECC block contains C1 (first ECC) for intra-sector error correction and C2 (second ECC) for sector-to-sector error correction. In the example of FIG. 9, the Reed-Solomon code with the symbol length of eight is used as ECC.

In this case, each ECC block is assumed to be made up of 192 sectors. Of these sectors, 176 sectors ranging from sector 0 to sector 175 are allocated as data sectors and the remaining 16 sectors as the second ECC. One sector is illustratively formed by 512-byte data supplemented with four-byte CRC (cross check code) and 48-byte C1 in a four-interleave structure.

Where each ECC block is formed by 129 sectors, if one track is made up of 768 sectors in a given zone, then a quarter of the track is constituted by an ECC block (25%: 192/768=0.25). If one track is made up of 480 sectors in another zone, then 1/2.5 of the track is constituted by an ECC block (192/480=0.40). This structure signifies that there exists an ECC block spanning two tracks and that each forty-percent portion of the track is formed by an ECC block.

The error correction performance with this embodiment is examined below. Random errors are corrected using C1 for up to 24 bytes per sector (or for up to 48 bytes if byte drop-out information is available). Burst errors are corrected using C2 for up to eight sectors per track (or for up to 16 sectors if the result of CRC is utilized).

The error correction block structure above is adopted primarily for the following reasons: many conventional HDD systems correct errors on a sector-by-sector basis, each sector being composed of 512-byte data and an information bit. That means the HDD can correct random errors that may occur within each sector but cannot correct those random errors in excess of the correctable range as well as burst errors, i.e., errors that continue across sector boundaries.

In such cases, retry operations are carried out conventionally to keep the level of read errors under a predetermined level for error correction. However, each retry operation is basically equivalent to another access pass on the same track. This amounts to an extra access time. Whereas access time is shortened using the track-by-track access scheme, retry operations lead to increases in access time resulting ultimately in delays in data reading.

Illustratively, where AV content is handled for high-definition (HD) picture reproduction, special-effects playback, or other actions that require high data transfer rates, there may occur uncorrectable read errors that cannot be handled in time by retry operations. In such cases, the read errors are left uncorrected given the present state of the art. As a result, the quality of image reproduction is worsened.

Under these circumstances, the second embodiment of this invention utilizes the above-described ECC structure for stable data reproduction. The structure allows the embodiment to minimize cases in which retry-inducing errors cannot be corrected. According to the invention, the conventional error correction scheme using C1 for intra-sector error correction is supplemented with C2 for sector-to-sector error correction. That is, an error correction increment (i.e., ECC block) is made up of C1 and C2 in this structure.

Although no mention was made above of interleaves in connection with the example of FIG. 9, it is necessary to apply the interleave scheme to the 512-byte data field where the Reed-Solomon code with the symbol length of eight is in use. FIGS. 10 and 11 show cases in which interleaves are applied to the ECC block structure for the second embodiment of this invention.

In FIGS. 10 and 11, interleaves are shown applied to a sector "n" that is divided into a four-byte header, 512-byte data, and four-byte CRC. These sector parts are added up for each sector, and the sum is divided into four portions each supplemented with 12-byte ECC C1. Illustratively, interleave 0 is constituted by supplementing a one-byte header, 128-byte data, and one-byte CRC with 12-byte parity data each. The same applies to interleaves 1, 2 and 3.

Inside the sector, the interleaves 0, 1, 2 and 3 are arranged in a cyclically repeated manner, in that order. The four-byte header comes first, followed by 512-byte data, four-byte CRC, and the C1 code generated as described above. FIG. 10 shows a breakdown of the interleave-based structure. FIG. 11 depicts how addresses 0 through 567 are allocated in memory space.

In this manner, what is shown in FIGS. 10 and 11 is the same sector-by-sector increment depicted in FIG. 9. That is, a four-byte header, 512-byte data, four-byte CRC, and 48-byte ECC C1 are added up to form a single sector. These parts are the major components of each of the sectors on the magnetic disc 21 to which to record data. Actual pieces of write data are each supplemented further with a preamble, a sync signal part, and a postamble. Alternatively, the disc may be formatted into increments of sectors without recourse to header files or CRC.

The interleave structure above can be determined primarily on a hardware basis. Where the Reed-Solomon code with the symbol length of eight is in use, the interleave structure in the C1 direction (i.e., in the sector direction) is applied illustratively as shown in FIG. 10.

The interleaves above may also be applied to C2 with which error correction is carried out between sectors. In that case, the notation "bytes" in the data part in FIG. 10 may be read as "sectors" for deploying interleaves in the C2 direction (i.e., perpendicular to the sectors). This also makes it possible to implement the same structure and function as those above using the interleaves.

Although one sector was shown to be made up of 512-byte data in the example above, this is not limitative of the invention. Alternatively, if one sector is composed of 1,024 bytes or 2,048 bytes of data, the ECC block structure can still be implemented both for each sector and across sectors in the same manner as described above.

2-4. Typical Formats and Processes

In establishing C2 sectors making up the ECC block structure, the second embodiment uses information about the number of those sectors between servo areas which are liable to constitute an increment of burst errors. As discussed earlier, one sector forms a first error correction increment (C1 error correction increment).

In the example of FIG. 8A, eight sectors exist between two servo areas (i.e., within a servo frame). Thus the number of C2 sectors making up an ECC block is set for a multiple of eight. If the formation of each ECC block is subject to constraints that prevent the sector count from being set for a multiple of eight, then a minimum sector count should be equal to or greater than a multiple of eight. For example, if two servo frames are used as the basis for setting C2 sectors, then 16 C2 sectors are set to constitute an ECC block. It might happen that the number of C2 sectors needs to be a multiple of, say, three, due to constraints on the block formation. In that case, the smallest multiple of three exceeding 16 sectors making up two servo frames is 18, so that the C2 sector count is set for 18.

In the example of FIG. 8B, the number of sectors between two servo areas (in a servo frame) is not the integer 8 but 8.5. In such a case, an integer number of sectors need to be set using total sector count information included in the servo frame of interest. For example, if one servo frame is used as the basis for setting the sector count, the number of C2 sectors forming an ECC block is set for nine. If two servo frames are used as the basis for setting the sector count, the number of C2 sectors constituting an ECC block is set for 17. Alternatively, as in the example of FIG. 8A, it might happen that the C2 sector count needs to be set for a multiple of three due to the constraints on ECC block formation. In that case, the smallest multiple of three exceeding 17 sectors making up two servo frames is 18, so that the C2 sector count is set for 18.

Described above has been the manner in which the C2 sector count is typically set. If the ECC block format of FIG. 9 is made up on the basis of the setup in FIG. 8A, then this ECC block constitutes a format in which up to 16 sectors equivalent to two servo frames can be corrected for error per block structure increment.

Figure 16:
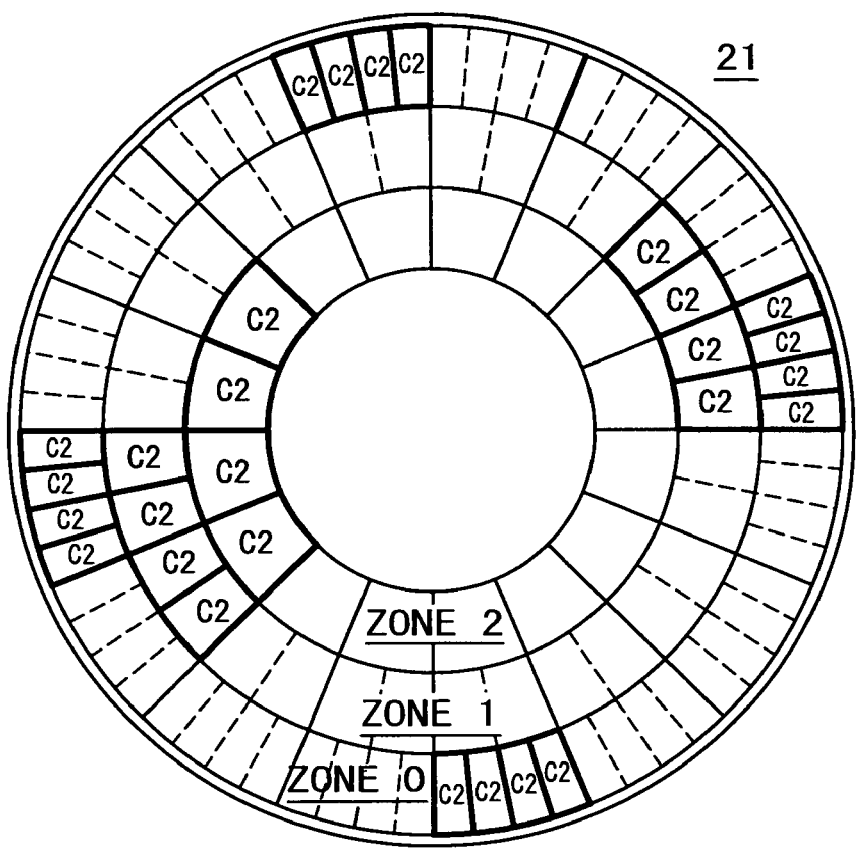
FIG. 16 is an explanatory view sketching how C2 sectors are set when slips occur in a fixed ECC block with the second or the third embodiment in use.

FIG. 16 schematically shows how an ECC block is typically structured. The example of FIG. 16 is shown to be a fixed ECC block structure over the entire disc surface. This example highlights a ZBR (zone bit recording) scheme setup and a servo area layout. In FIG. 16 (as in FIG. 18, to be discussed later), radially drawn solid lines indicate servo areas as well as sector boundaries, and broken lines point to sector boundaries only. In this example, as in the example of FIG. 8A, there exist an integer number of sectors between two servo areas.

For purpose of simplification and illustration, it is assumed that this fixed ECC block structure has each of its ECC blocks formed by 16 sectors including 12 data sectors and four C2 sectors regardless of the zone. The specific sector counts are only for illustration purposes. Where the ECC block increment is formed by 192 sectors as shown in FIG. 9 above, the description that follows should also apply.

In FIG. 16, the magnetic disc 21 is divided into three zones. The number of sectors per track differs from one zone to another. There are 64 sectors per track in zone 0, 32 sectors in zone 1, and 16 sectors in zone 2. The disc revolutions are held constant from one zone to another while the operation clock is varied so that track recording density is kept within a predetermined range in each zone.

In this setup, the servo areas indicated by 16 radially drawn solid lines are provided in the radial direction regardless of the zones 0, 1 and 2 being formed concentrically. The operation clock for the servo areas is established apart from that for the data areas; suitable servo zones are provided over the entire disc surface (for servo clock). The disc revolutions are kept constant in the data areas as well as in the servo areas.

In the ECC block structure above, each sector is supplemented with C1. The C1 structure is assumed to be fixed and identical. Specifically, as shown in FIG. 9, 512-byte data per sector are supplemented with 48-byte C1.

If each ECC block is formed by 16 sectors over the entire disc surface as described above, a quarter of a track makes up one ECC block structure increment in the zone 0 where there are 64 sectors per track. A half-track constitutes one ECC block structure increment in the zone 1 with 32 sectors per track, and a whole track constitutes an ECC block structure increment in the zone 2 with 16 sector per track.

In each ECC block structure increment, C2 sectors are laid out in increments of servo frames. With the second embodiment of this invention, the C2 structure is fixed and identical for the entire disc. In this case, each ECC block is made up of 16 sectors including 12 data sectors and four C2 sectors in all zones.

Given that the ECC block structure is fixed and that C2 sectors are arranged in increments of servo frames within each ECC block structure increment, C2 sectors are laid out as shown in FIG. 16. Specifically, in the zone 0, there are four sectors per servo frame, so that four C2 sectors are established for one servo frame. These sectors, combined with 12 data sectors, form one ECC block per quarter-track. In other words, four ECC blocks are provided per track.

In the zone 1, there are two sectors per servo frame, so that four C2 sectors are established for two servo frames. These sectors are combined with 12 data sectors to form one ECC block per half-track. In other words, two ECC blocks are furnished per track.

In the zone 2, there is one sector per servo frame, so that four C2 sectors are established for four servo frames. These sectors are combined with 12 data sectors to make up one ECC block per track. In other words, one ECC block is provided per track.

When viewed in increments of servo frames each made up of C2 sectors as described in the above structure, the zone 0 is furnished with one servo frame, zone 1 with two servo frames, and zone 2 with four servo frames. That means at least one servo frame, i.e., the minimum C2 sector increment, is secured in every ECC block structure increment. More specifically, the zone 0, which is the outermost zone, is provided with at least one servo frame (as the minimum C2 sector increment).

Figure 17:
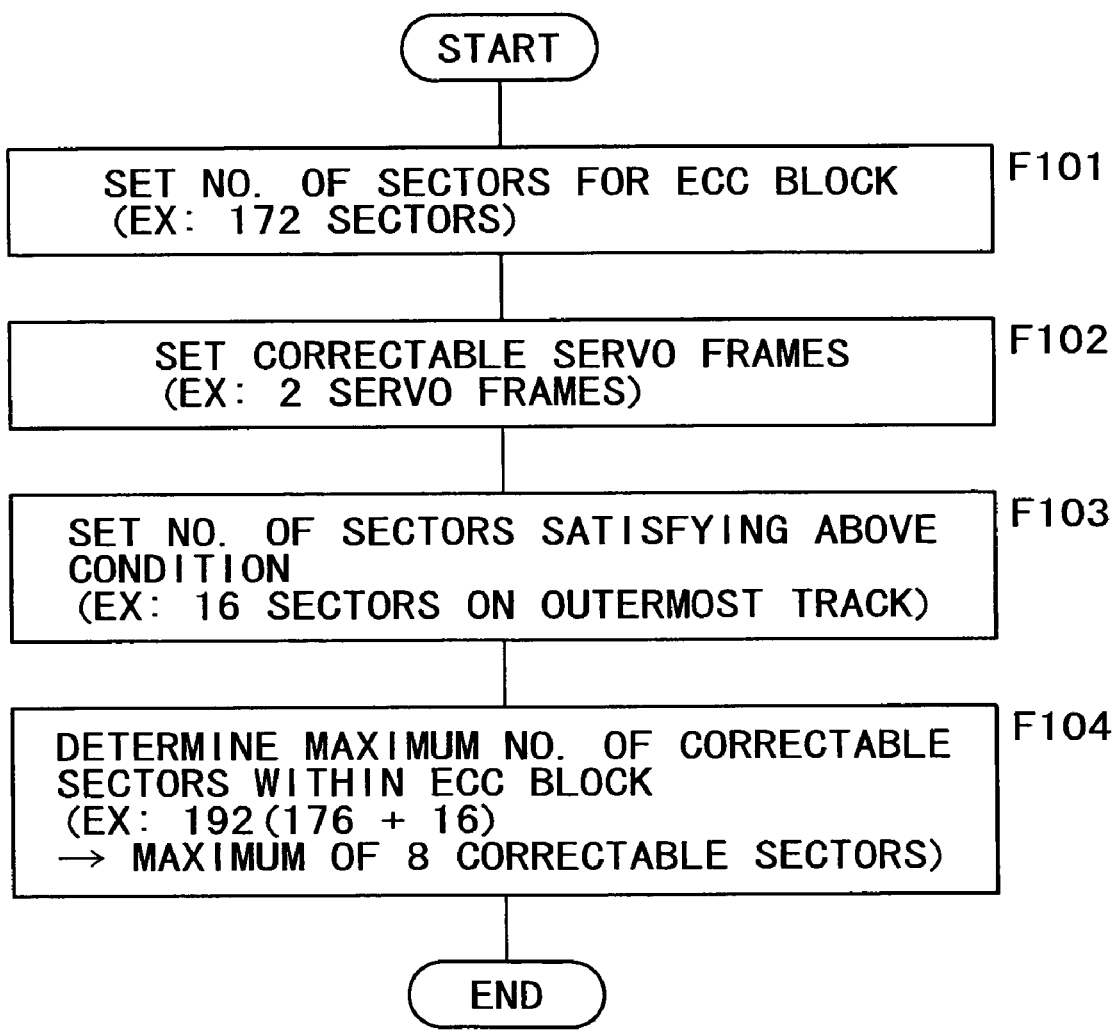
FIG. 17 is a flowchart of steps for setting sectors in a fixed ECC block with the second or the third embodiment in use.

FIG. 17 is a flowchart of typical steps for establishing a fixed ECC block structure for the entire disc surface, as shown in FIG. 16. These steps presuppose that each ECC block has a fixed sector count of 192 as discussed in conjunction with FIG. 9.

In step F101, the number of sectors per ECC block is established. For example, 192 sectors are set to form one ECC block.

In step F102, the number of correctable servo frames is established. Illustratively, two servo frames are set to be correctable. This determines the redundancy rate for correction with C2 sectors.

In step F103, the number of sectors satisfying the two servo frames determined above is established. Since the ECC block structure is fixed over the entire disc surface, the number of sectors per servo frame in an inner zone may be different from that in an outer zone. In such a case, the largest number of sectors per servo frame is used as the basis for setting the sector count. Under the ZBR scheme, the outermost zone has the largest sector count which, in this case, is assumed to be 16. That is, in the outermost zone, one servo frame contains eight sectors as shown in FIG. 8A, so that the two correctable servo frames are made up of 16 sectors.

In step F104, a maximum correctable sector count is set for the ECC block established this time. In this example, up to eight sectors are set to be correctable (or up to 16 sectors if drop-out correction information is available) in the 192-sector ECC block.

Carrying out the steps in FIG. 17 allows C2 sectors to be set so that errors can be corrected per predetermined servo frame count in the fixed ECC block structure over the entire disc surface, regardless of the zone. The steps in FIG. 17 may be executed as part of the error correction coding and error correcting functions implemented by the disc controller 13 and CPU 12 during a read or a write operation. In that case, the performance of error correction may be raised or lowered as needed by modifying the number of sectors per ECC block as well as the correctable servo frame count.

If there is no need to alter the performance of error correction, the above steps may be carried out beforehand within the HDD 10 (i.e., by the CPU 11) or by an external device. The resulting settings constituting the ECC block structure (in terms of the data sector count and C2 sector count) may then be stored in the disc controller 13 or CPU 11. At the time of a write or a read operation, ECC processing may be effected by referencing the previously stored settings.

Figure 18:
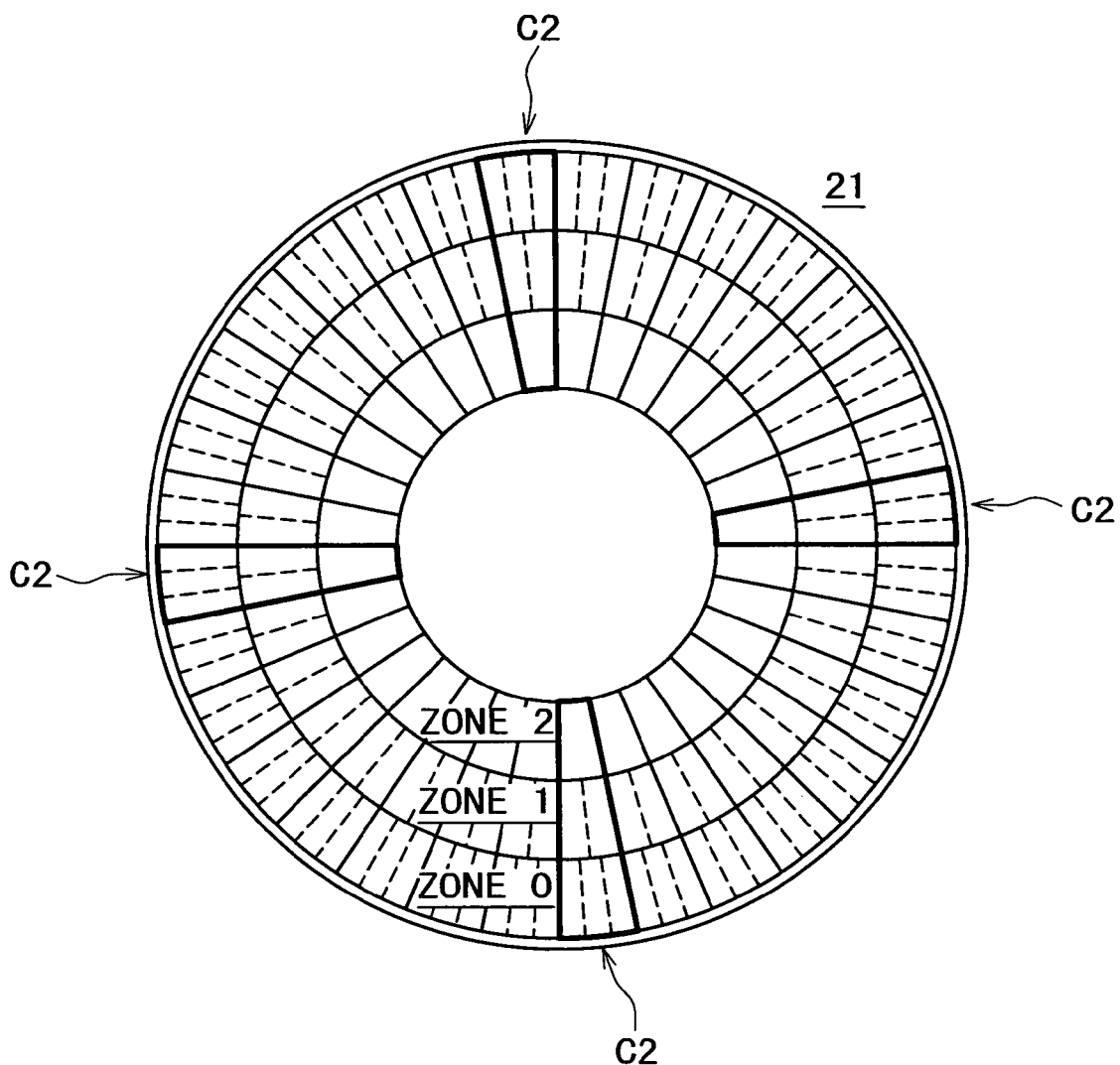
FIG. 18 is an explanatory view showing how C2 sectors are set in a variable ECC block with the second or the third embodiment in use.

How the ECC block structure is varied from one zone to another will now be described with reference to FIG. 18. FIG. 18 shows C2 sectors laid out with one servo frame of C2 sectors (between two radially furnished servo areas) taken as the minimum C2 sector increment. In the example of FIG. 18, radially drawn solid lines indicate servo areas. There are 32 servo areas per track. The number of sectors per track is 96 in the zone 0, 64 in the zone 1, and 32 in the zone 2.

Each sector is furnished with C1 as ECC. It is assumed that the C1 structure is fixed and identical. A typical structure is shown in FIG. 9, where one sector has 512-byte data supplemented with 48-byte C1. The C2 structure is changed from one zone to another. Over the entire disc surface, a quarter of a track is set to constitute an ECC block increment. Within each ECC block increment, the C2 sectors making up one servo frame are established the minimum C2 sector increment.

If one servo frame of C2 sectors is established in each ECC block increment, the structure is changed from one zone to the next as follows: in the zone 0, one servo frame contains three sectors, and a quarter of a track has 24 sectors. Thus 24 sectors, i.e., 21 data sectors supplemented with three C2 sectors, constitute an ECC block in the zone 0. In the zone 1, one servo frame contains two sectors, and a quarter of a track has 16 sectors. Thus 16 sectors, i.e., 14 data sectors supplemented with two C2 sectors, make up an ECC block in the zone 1. In the zone 2, one servo frame contains one sector, and a quarter of a track has eight sectors. Thus eight sectors, i.e., seven data sectors supplemented with one C2 sector, form an ECC block in the zone 2.

In the manner described, one ECC block is divided into four parts per track. That means four C2 areas are provided per track, as shown in FIG. 18. In all zones and in all ECC block increments, the C2 sectors forming one servo frame are secured as the minimum C2 sector increment.

FIG. 19 is a flowchart of steps for varying the setting of an ECC block from one zone to another as depicted in FIG. 18. In step F201, a zone is selected. For example, if there are 16 zones (zones 0 to 15) on the disc, one of them, such as zone 0, is selected.

In step F202, the number of sectors per ECC block in the zone 0 is determined. Illustratively, 192 sectors are set to constitute an ECC block.

In step F203, the number of correctable servo frames is determined in keeping with a predetermined redundancy rate for C2-based error correction. For example, two servo frames are set to be correctable.

In step F204, the number of sectors satisfying the two correctable servo frames determined above is established. In this example, the ECC block structure is set for each zone. Where the zone 0 was set in step F201 earlier, the number of sectors included in the servo frames of the zone 0 may be taken into account in carrying out step F204. If one servo frame contains eight sectors in the zone 0, then 16 sectors are set in this step to fill the two servo frames.

In step F205 following the steps above, the maximum number of correctable sectors in the ECC block established this time is determined. For example, up to eight sectors are set to be correctable (or up to 16 sectors if drop-out correction information is available) in the 192-sector ECC block.

Performing the steps of FIG. 19 establishes for each zone an ECC block in which two servo frames are made correctable, for example. The processing in FIG. 19 may be executed as part of the error correction coding and error correcting functions implemented by the disc controller 13 and CPU 12 during a write or a read operation to or from a given zone. In that case, the performance of error correction may be raised or lowered as needed by modifying the number of sectors per ECC block as well as the correctable servo frame count.

If there is no need to alter the performance of error correction, the steps above may be carried out beforehand within the HDD 10 (i.e., by the CPU 11) or by an external device. The resulting settings constituting the ECC block structure (in terms of the data sector count and C2 sector count) may then be stored in the disc controller 13 or CPU 11. At the time of a write or a read operation, ECC processing may be effected by referencing the previously stored settings.

With the HDD 10 of the second embodiment, the ECC block established as described in the above two examples forms an efficient ECC block structure based on the servo frames (i.e., on the number of sectors contained in the servo frames). This structure allows the HDD 10 to constitute a stable system that minimizes ECC-induced redundancy, keeps the data transfer rate high, and corrects random errors and burst errors over much wider ranges than before.

In the typical flowcharts of FIGS. 17 and 19, the ECC block count was shown to be established first. Alternatively, the C2 sector-induced redundancy may be determined first, followed by establishment of an ECC block. The alternative approach provides the same effects when the settings are based on the servo frames.

Although not shown in the examples of FIGS. 16 and 18, each ECC block may be set to be formed by 10 sectors. In this case, the ECC block will not be formed by the same track alone; part of the ECC block is constituted by part of the next track. This approach also proves effective when the ECC block is formed in increments of servo frames.

3. Third Embodiment

3-1. Access Operations

The third embodiment of this invention will now be described. The structure of the hard disc drive 10 practiced as the third embodiment of the invention is basically the same as that shown in FIGS. 1 and 2. In this structure, as will be discussed later, data access control is executed in a manner implementing a system that shortens access time and improves data transfer rate. On each track reached by a seek, an access operation starts from the first accessible sector and continues along the entire track. The system works in conjunction with an ECC block structure that reflects the servo area setup on the magnetic disc 21. This makes it possible to correct random errors and burst errors in significantly wider areas than before. That in turn helps avert retry operations and minimize drops in data transfer rate. The servo area layout and the sector layout in the servo frames are the same as those described in connection with FIG. 7, FIG. 8A and FIG. 8B.

The access operation is described first. The HDD 10 accesses the entire target track starting from the sector on which the magnetic head 22 has reached the track. The sectors on each track have no fixed sector numbers; they are addressed as relative locations. The relative location scheme allows each track to be accessed starting from any one of its sectors. That is, access to the disc is accomplished on a track-by-track basis, so that there is no need for the unpredictable look-ahead processing. This makes it possible to determine exactly when to start seek operations. Because each track can be accessed starting from any one of its sectors, rotational delays are eliminated. As a result, the number of seeks to be done is minimized and the access time involved is shortened.

To write data to a given track involves assigning a relative location address to the sector from which the track in question starts getting accessed. To read data from a given track involves first reaching one of its sectors from which to start accessing the entire track. The retrieved data are placed into the buffer RAM 14 in accordance with the relative location addresses. The data read operation may be started from any one of the sectors making up the target track.

The operations above are made possible by resorting to sector formats shown in FIGS. 20A and 20B. One typical sector format, illustrated in FIG. 20A, is made up of a relative location data field, a data field, and an ECC field. The relative location data field represents the relative location of this sector on the track in question, and the ECC field is used for error correction over the entire area of this sector. These three fields constitute both an error-correctable range and a recordable range. Because the relative location data are included as a header in the error-correctable range, the relative location data can be restored by correcting random errors that may occur within the sector. This allows disc access operations to proceed smoothly. Generally, each sector has its sector address written in its ID field not as an absolute location but as a relative location. That means the ID field can be reduced in size, allowing the data field to be that much larger to accommodate more data, whereby storage space can be utilized more effectively.

In a data write operation onto a given track, a relative location is assigned to the sector from which the track in question starts getting accessed. ECC data are generated on the basis of the relative location and write data. The relative location is recorded to the relative location field, the write data to the data field, and the ECC data to the ECC field. Rotational delays do not occur because the write data start getting recorded to the sector from which access to the track of interest is initiated.

In a data read operation on a given track, reading of data is started from the sector from which access to the track is initiated. Where to store the retrieved data in the buffer RAM 14 is determined on the basis of the location of the sector acquired from its relative location field. Thus even if data start getting read from any one of the sectors constituting the target track, the retrieved data are rearranged in the buffer RAM 14 in accordance with their relative locations so that the data from the track are reconstituted in the original sequence. Rotational delays do not occur as well because the target data start getting read from the sector on which access to the track of interest is started.

FIG. 20B shows another typical sector format for use by the HDD 10 practiced as the third embodiment of this invention, the format being used on the tracks of the magnetic disc 21. In this case, as in the cases earlier, each sector is made up of a relative location data field, a data field, and an ECC field. The three fields form an error-correctable range. Unlike the example of FIG. 13A, however, the relative location data field is not included in the recordable range. The absence of the relative location data field increases correspondingly the size of a field usable for accommodating data within the sector, whereby storage space can be utilized more effectively.

That being the case, in a data write operation onto a given track, a relative location is assigned to the sector from which the track in question starts getting accessed. ECC data are generated on the basis of the relative location and write data. Only the write data and ECC data are recorded to the sector in question. Rotational delays do not occur because the write data start getting recorded to the sector from which access to the track of interest is initiated.

In a data read operation on a given track, reading of data is started from the sector from which access to the track is initiated, and any error that may have occurred is corrected using ECC. This permits reconstitution of that relative location of the sector which was not written to the sector in question. Where to store the retrieved data in the buffer RAM 14 is determined on the basis of this relative location. Thus even if data start getting read from any one of the sectors constituting the target track, the retrieved data are reconstituted in the buffer RAM 14 in the original sequence. Rotational delays do not occur as well because the target data start getting read from the sector on which access to the track of interest is started.

With the above-described sector formats in use, how the host communicates with the HDD 10 upon data write and read operations will now be described. The HDD 10 embodying this invention works as described below when writing data in response to a command from the host connected via the interface 17.

The host first issues a data write command to the HDD 10. In a response to the host, the HDD 10 designates an address area that will involve a minimum seek time in view of the current access sequence. Given the response from the HDD 10, the host transfers data content that will fit the size of the designated address area (in byte count, sector count, etc.). The HDD 10 receives the data content and writes what is received on a track-by-track basis.

As described above, the sectors of the track to which to write data are assigned relative location information relative to the access starting location on the track in question. This arrangement frees the host 50, upon requesting a data write operation, from having to become aware of a specific write destination in terms of cylinder numbers, head numbers or sector numbers; there is no need for the host 50 to designate these numbers. Illustratively, the address area may be reported from the HDD 10 to the host simply in terms of a content number for identifying the content that the host requests the HDD 10 to write. The HDD 10, for its part, prepares a translation table associating each content number with corresponding physical recording locations on the disc 21. With this embodiment, the disc 21 is accessed on a track-by-track basis, so that the translation table is prepared illustratively as shown in FIG. 21. In the table, content numbers are associated with corresponding track numbers and head numbers.

It should be noted that no sector numbers under the CHS scheme are included in the translation table. The sectors making up the target track to which to write data are assigned relative location information relative to the access starting sector of the track in question. In this makeup, the data read from the track can be reconstituted on the basis of the relative location information on each sector regardless of the sector on which access to the track was initiated for data retrieval. This eliminates the need for designating an access starting sector in the translation table.

The translation table is written to the buffer RAM 14. The writing of the table to the RAM 14 is carried out when write data are received from the host 50, under control by software executed by the disc controller 13 or by the CPU 11.

When the HDD 10 of this embodiment reads data in response to a command from the host connected through the interface 17, communications take place as follows. The host first issues a data read command to the HDD 10. The data read command has a target content number designated therein. Given the content number, the HDD 10 selects accordingly the target tracks from the translation table of FIG. 21 and causes the magnetic head 22 to do seeks. The HDD 10 transfers to the host the data retrieved from the disc 21 in accordance with the address area sequence designated in an earlier data write operation. When making a data read request, the host need only designate a relevant content number. There is no need for the host to become aware of specific write locations (PBA) in terms of cylinder numbers, head numbers or sector numbers.

As described above, the HDD 10 accesses the entire track starting from the sector on which the magnetic head 22 reached the track in question. Since access to the disc is carried out on a track-by-track basis, when to do seeks is determined reliably without recourse to the unpredictable look-ahead processing. Each track can be accessed starting from any one of its sectors. This makes it possible to start writing and reading data to and from any location where the magnetic head is positioned immediately after the seek over the disc. With rotational delays thus eliminated, the number of seeks is minimized and access time is shortened.

The disc access operation described above is implemented by the disc controller 13 giving suitable hardware operation instructions to the data read/write control unit 15 and servo control unit 16 in response to the results of command processing by the CPU 11.

3-2. ECC Structure

As discussed above, the HDD 10 of this embodiment accesses the disc in increments of tracks. In this case, it is appropriate to form an ECC block on a track-by-track basis on the magnetic disc 21.

Figure 22:
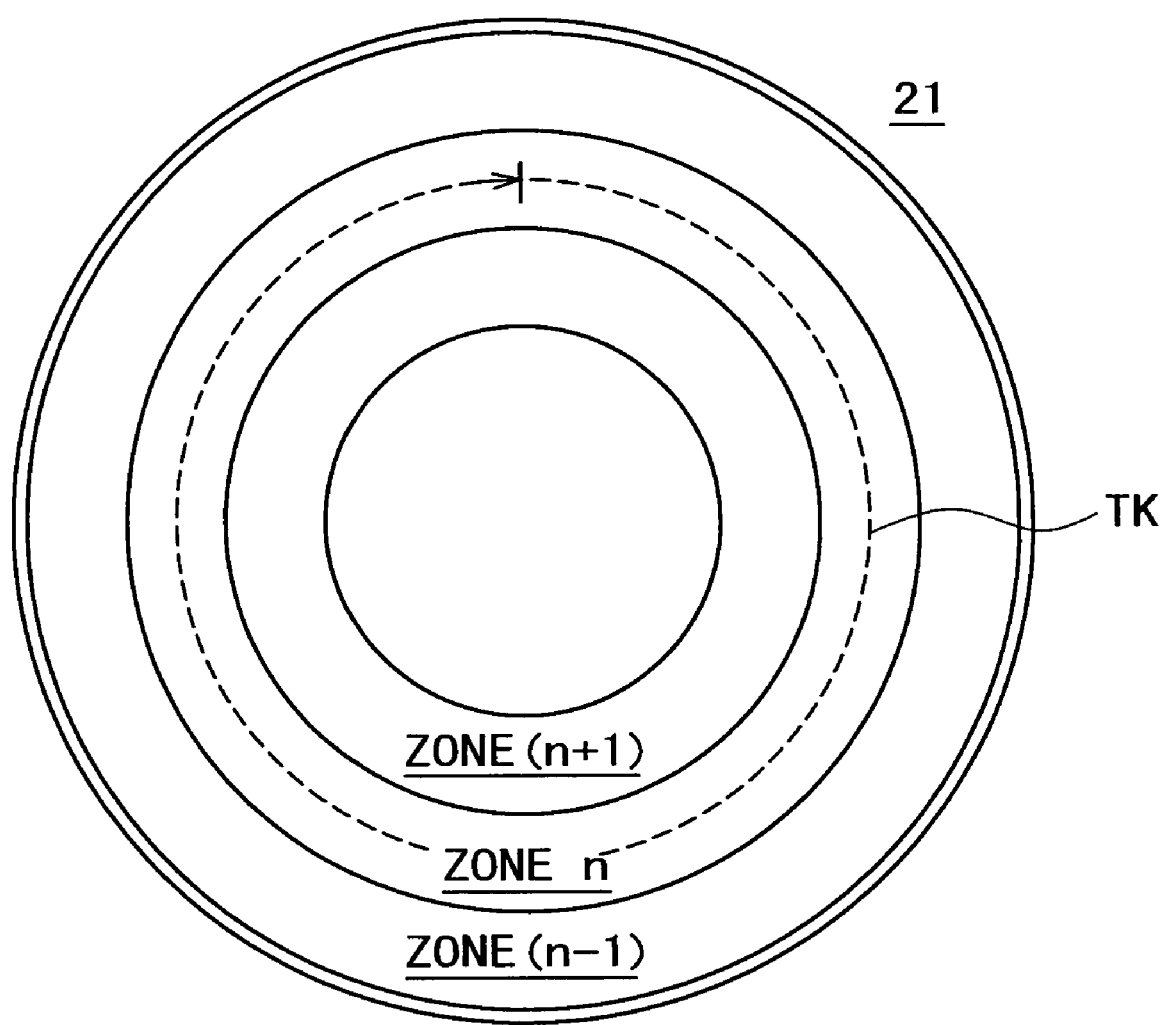
FIG. 22 is an explanatory view of an ECC block formed per track for use by the second and the third embodiments.

FIG. 22 shows a typical ECC structure for this embodiment. In the example of FIG. 22, the magnetic disc 21 is divided into zones. Of these zones, a zone "n" is shown having an ECC block structure. Specifically, a broken line in the zone "n" indicates a track TK constituting in its entirety an ECC block increment, which applies to each of the other tracks as well. The ECC block contains an ECC increment called C1 for intra-sector error correction and an ECC increment called C2 for sector-to-sector error correction. The combination of C1 and C2 makes up an error correction increment (ECC block structure increment) provided per track. Two or more ECC block structure increments do not exist within each track.

Over an integral number of tracks (e.g., three tracks), a single ECC block may illustratively be formed by the combination of C1 and C2.

Figure 23:
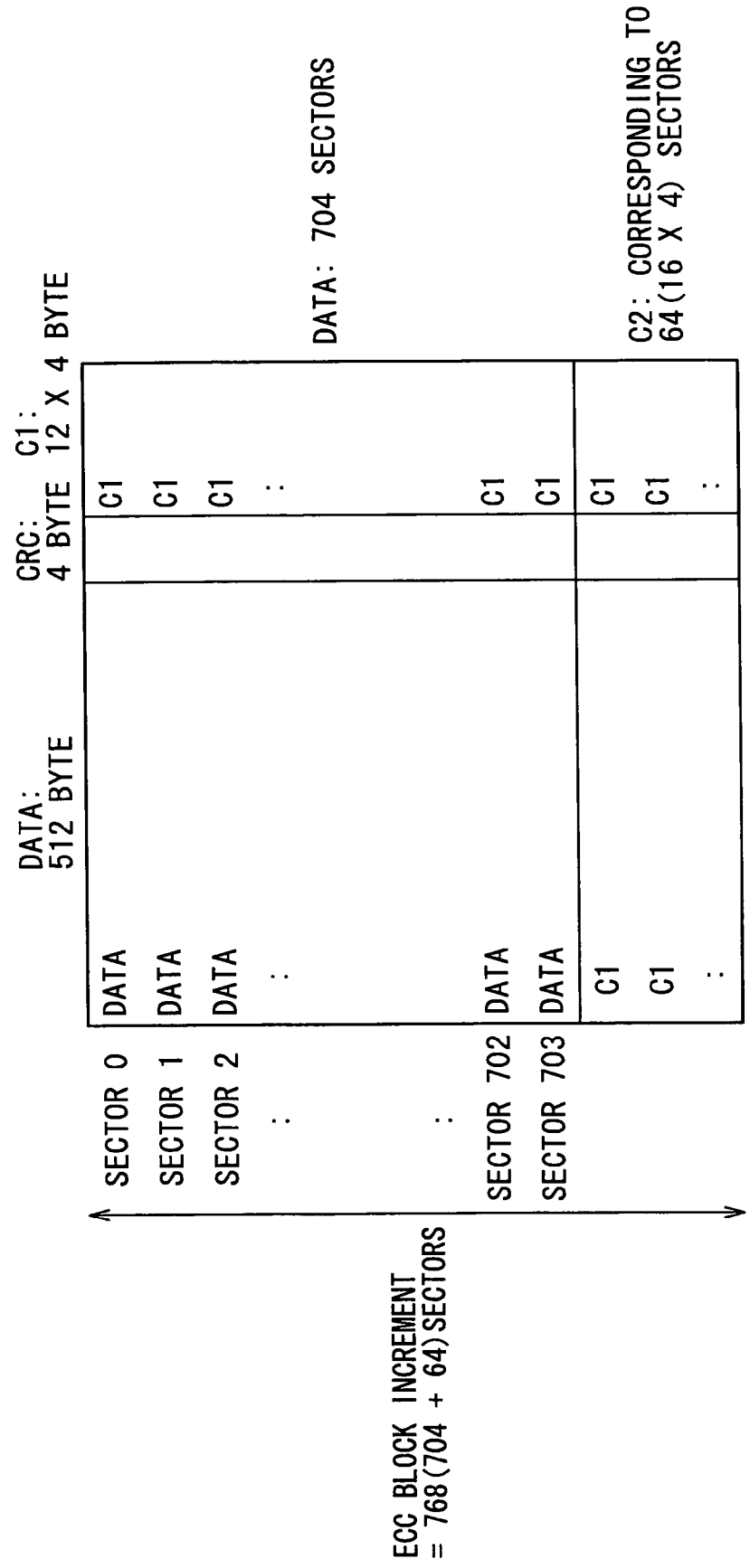
FIG. 23 is an explanatory view of an ECC block structure for use by the second and the third embodiments.

FIG. 23 shows a typical ECC block structure on the magnetic disc 21 that adopts the ECC block structure indicated in FIG. 22. In the example of FIG. 23, the Reed-Solomon code with the symbol length of eight is used as ECC. It is assumed here that the number of effective sectors per track is 768 in a given zone of a magnetic disc. One sector is illustratively formed by 512-byte data supplemented with four-byte CRC (cross check code) and 48-byte C1 in a four-interleave structure.

In the ECC block structure of FIG. 23, 704 sectors ranging from sector 0 to sector 703 are provided as a data field, and 64 sectors from sector 704 through sector 767 are furnished as a C2 field. The C2 field is illustratively made up of four interleaves for every 16 sectors. In this structure, one ECC block has a total of 768 sectors. Within this zone, these sectors constitute an entire track.

The error correction performance with this embodiment is examined below. Random errors are corrected using C1 for up to 24 bytes per sector (or for up to 48 bytes if byte drop-out information is available). Burst errors are corrected using C2 for up to 32 sectors per track (or for up to 64 sectors if the result of CRC is utilized).

As with the second embodiment of this invention discussed above, the conventional error correction scheme using C1 for intra-sector error correction is supplemented with C2 for sector-to-sector error correction when adopted by the third embodiment. This ECC structure combines C1 with C2 for stable data reproduction, and allows the embodiment to minimize cases in which retry-inducing errors cannot be corrected.

The structure is such that an error correction increment (i.e., ECC block) made up of C1 and C2 is complete per track. As mentioned above, the ECC block increment is basically brought about on a track-by-track basis. When the ECC block increment made up of C1 and C2 is complete per track, access to the disc is performed on a track-by-track basis. This makes it possible to implement data access control without incurring rotational delays. That is, the time to access desired data storage locations is shortened. Because two or more ECC blocks do not exist on the same track, data access control is brought about without rotational delays even if the ECC structure spans a plurality of tracks.

Described below are the internal workings of the disc controller 13 in effect upon error correction. The disc controller 13 receives formatter control information and zone change ECC control information from this CPU 11. The formatter control information is about formatting of the disc accessed in increments of tracks, whereby each track is accessed for the entire track length starting from the sector on which the track in question is first reached by a seek. This information is sent through the CPU interface 31 to the disc formatter 35 that provides disc formatting.

The zone change ECC control information is used for establishing the ECC structure that is complete per track. When zones are changed, so is the number of sectors per track. This in turn causes the ECC structure to change. This information is sent through the CPU interface 31 to the ECC controller 36 that establishes the ECC structure accordingly. The buffer RAM 14 is then accessed so that predetermined ECC processing will be carried out.

Although no mention was made above of interleaves in connection with the example of FIG. 23, it is necessary to apply the interleave scheme to the 512-byte data field where the Reed-Solomon code with the symbol length of eight is in use. In that case, interleaves may be applied to the ECC block structure as discussed above in connection with FIGS. 10 and 11.

Where the ECC block above is arranged to be complete per track, it may happen that the performance of error correction varies significantly between zones over the magnetic disc 21. That is because the number of sectors per track differs from one zone to another while the ECC parity count structure remains the same. This snag is circumvented by making the ECC block structure variable from one zone to another so that the redundancy rate of ECC is kept within a predetermined range. This renders the error correction performance uniform all over the disc surface.

Figure 24:
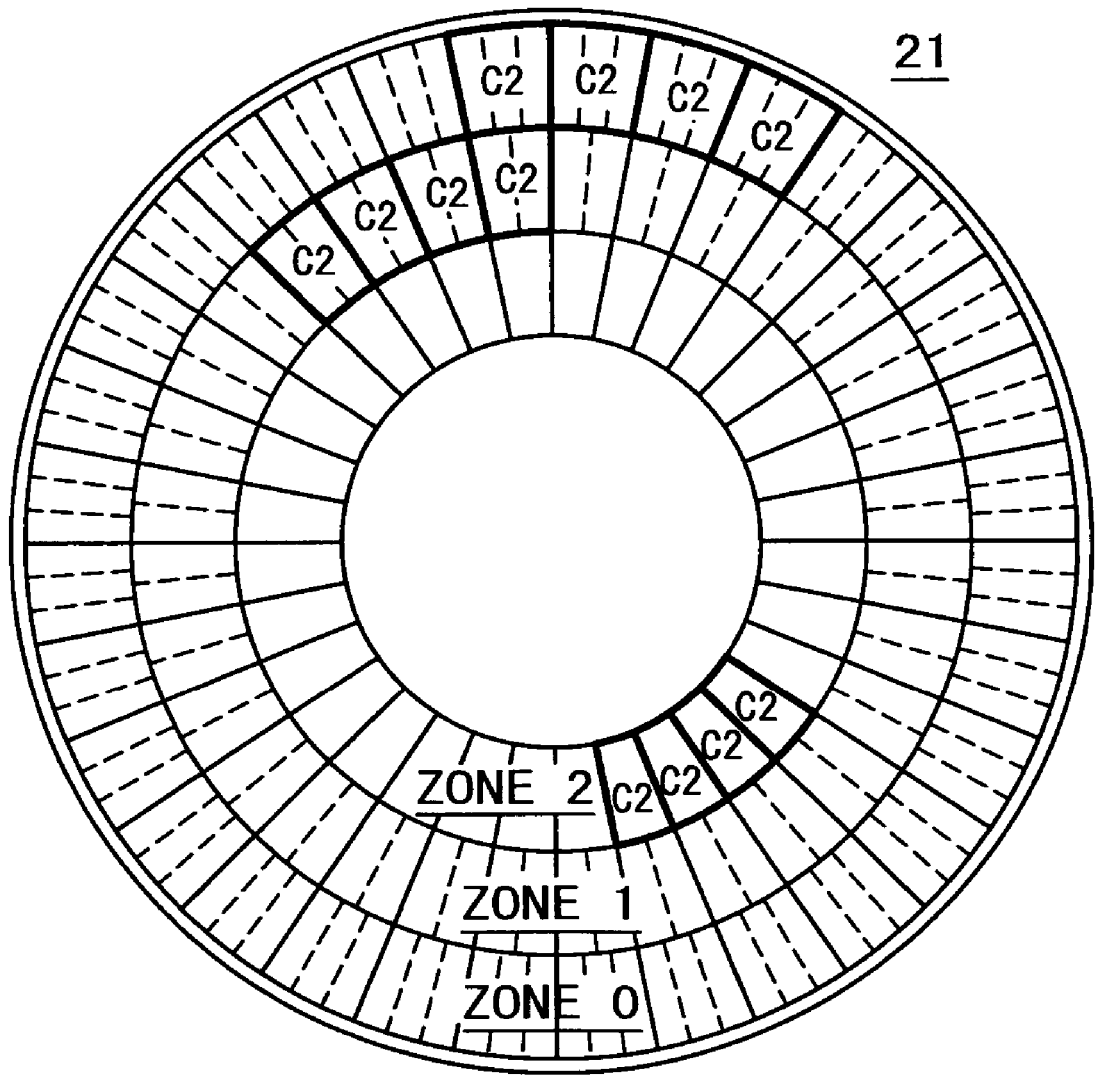
FIG. 24 is an explanatory view showing how C2 sectors are set in a ECC block formed per track for use by the second and the third embodiments.

FIG. 24 schematically shows a typical disc format in effect when the ECC block is varied depending on the zone. In FIG. 24, the magnetic disc 21 is divided into zones with a different sector count per track each. In this schematic example, the number of sectors per track is 96 in zone 0, 64 in zone 1, and 32 in zone 2. The number of revolutions is held constant for each zone but the operation clock is varied from one zone to another, so that the track recording density per zone is kept within a predetermined range.

In the ECC structure above, each sector is provided with C1. It is assumed that the C1 structure is fixed and unchanged as shown in FIG. 23. In the C2 structure, as illustrated, 12 sectors are assigned to the zone 0, eight sectors to the zone 1, and four sectors to the zone 2 as C2 parity each. The setting of C2 sectors will be described later. With this structure, the ratio of the number of C2 parity sectors to the number of data sectors per track remains constant from one zone to another. The performance of C2-based error correction is also made the same for each zone.

In the actual format, it is relatively rare for the ratio of the number of parity sectors to that of data sectors per track to be an integer number as shown in FIG. 24. The ECC block structure may then be varied from one zone to another so that the ECC redundancy rate is kept within a predetermined range.

As described, the ECC block is made to be complete per track in the C1 plus C2 structure, supplemented with interleaves. Furthermore, the ECC structure is varied from one zone to another in order to keep the redundancy rate of the ECC part within a predetermined range. This makes it possible to correct random errors and burst errors occurring more extensively than before over the entire disc surface, whereby stable data reproduction is implemented.

3-3. Typical Formats and Processes

FIG. 24 shows the ECC block structure varied from one zone to another as described above. In this structure, C2 sectors are established on the basis of the servo frames formed by radially arranged servo areas. What follows is a description of how the ECC block is established on the basis of the servo area setup.

In FIG. 24, radially drawn solid lines indicate servo areas as well as sector boundaries, and broken lines point to sector boundaries only. In each zone, the number of servo areas per track is 32. Each track has one ECC block formed as mentioned above. The ECC blocks are constituted in increments of tracks over the entire disc surface, so that the number of sectors making up each ECC block is changed from one zone to another. In the example of FIG. 24, four servo frames of C2 sectors are set to be correctable.

In the track-by-track ECC block structure, each of the zones 0, 1 and 2 is assigned a different data sector count and a different C2 sector count so that four servo frames are established as the C2 sectors for each zone. In this ECC block structure, four servo frames are laid out as a minimum C2 sector increment.

In FIG. 24, the four servo frames contain 12 sectors in the zone 0, eight sectors in the zone 1, and four sectors in the zone 2. Thus in the zone 0, the ECC block formed by 96 sectors per track is made up of 12 C2 sectors and 84 data sectors. In the zone 1, the ECC block formed by 64 sectors per track is constituted by eight C2 sectors and 56 data sectors. In the zone 2, the ECC block formed by 32 sectors per track is composed of four C2 sectors and 28 data sectors.

The ECC block is established in the manner described, with the C2 sectors laid out so as to complete each track in its entirety and to make specific servo frames correctable for errors. Four servo areas are laid out and recorded as C2 per track, as shown in FIG. 24. However, the servo areas need not be specifically located in physical terms; they can be laid out arbitrarily as illustrated for recording. FIG. 24 shows the servo areas arranged in arbitrary fashion in each zone for purpose of simplification. In practice, the servo areas are laid out and recorded arbitrarily in increments of tracks. In this case, however, the number of sectors and that of C2 sectors are still determined per zone. The sector count and C2 sector count vary from one zone to another.

Figure 25:
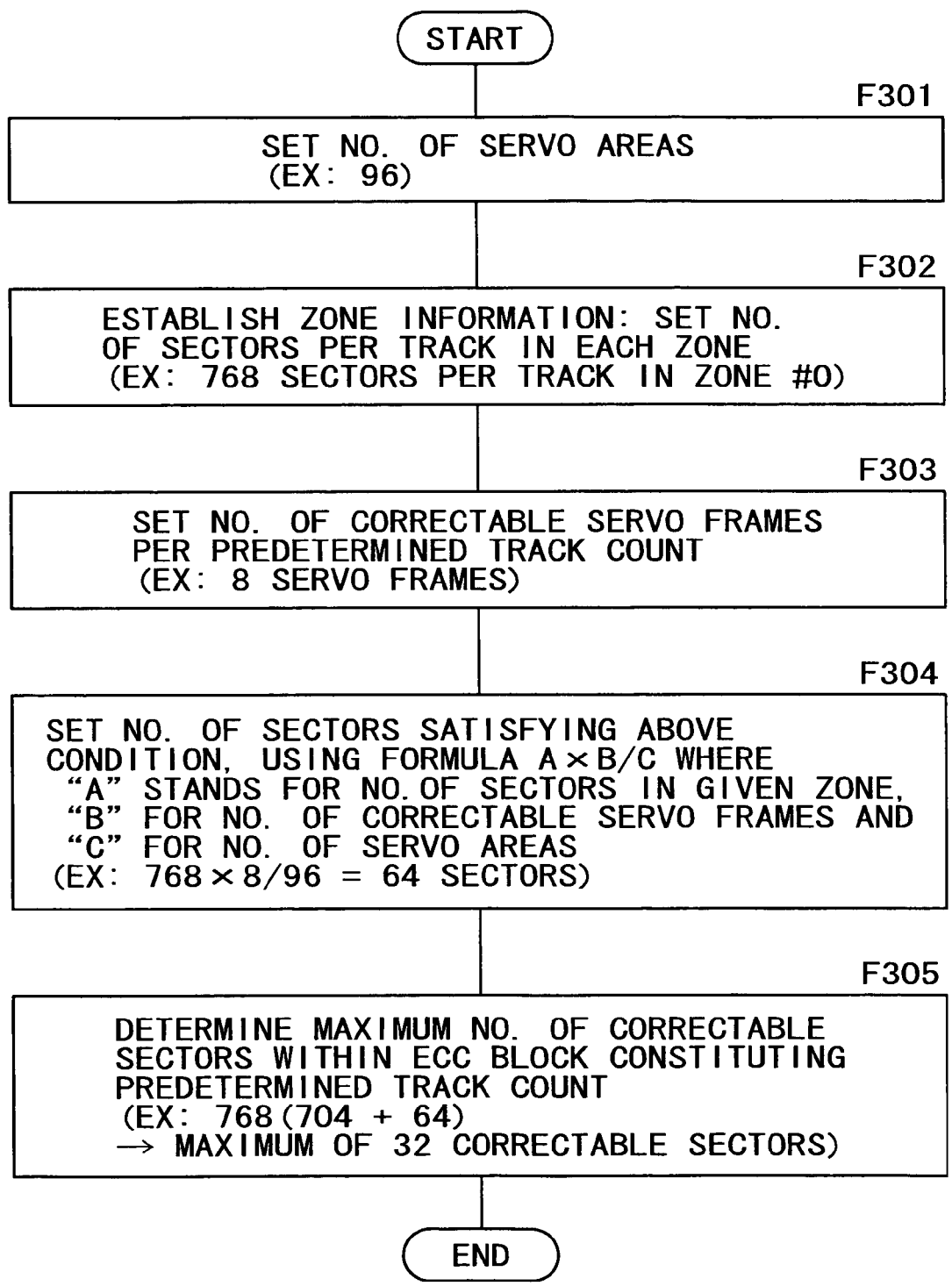
FIG. 25 is a flowchart of steps for setting C2 sectors in accordance with slip information with the second or the third embodiment in use.

FIG. 25 is a flowchart of steps for establishing the ECC block discussed above. In step F301, the number of servo areas is determined. Illustratively, the servo area count is set to 96.

In step F302, zone information is established. That is, the number of sectors per track (or per predetermined track count) is determined for in each zone. For example, a sector count of 768 is set per track for the zone 0.

In step F303, the number of correctable servo frames per predetermined track count is determined. Illustratively, eight correctable servo frames are set per track.

In step F304, the number of sectors satisfying the eight servo frames determined above is determined. In this case, the sector count is obtained using the following formula: (No. of sectors in a given zone)×(No. of correctable servo frames)/(No. of servo areas). For example, it can be seen that 768×8/96=64. In this case, 64 sectors are set aside as C2 sectors out of the 768 sectors arranged per track.

In step F305, the maximum number of correctable sectors within the ECC block constituting the predetermined track count is determined. Illustratively, up to 32 sectors are set to be correctable (or up to 64 sectors if drop-out correction information is available) in the 768-sector ECC block per track.

The processing in FIG. 25 may be executed as part of the error correction coding and error correcting functions implemented by the disc controller 13 and CPU 12 during a write or a read operation. In that case, the performance of error correction may be raised or lowered as needed by modifying the number of sectors per ECC block as well as the correctable servo frame count.

If there is no need to alter the performance of error correction, the steps above may be carried out beforehand within the HDD 10 (i.e., by the CPU 11) or by an external device. The resulting settings constituting the ECC block structure (in terms of the data sector count and C2 sector count) may then be stored in the disc controller 13 or CPU 11. At the time of a write or a read operation, ECC processing may be effected by referencing the previously stored settings.

With the HDD 10 of the third embodiment, the ECC block established as described above forms an efficient ECC block structure based on the servo frames (i.e., on the number of sectors contained in the servo frames). This structure allows the HDD 10 to constitute a stable system that minimizes ECC-induced redundancy, keeps the data transfer rate high, and corrects random errors and burst errors over much wider ranges than before.

Access to the disc is accomplished on a track-by-track basis, so that there is no need for the unpredictable look-ahead processing. This makes it possible to determine exactly when to start seek operations. Because each track can be accessed starting from any one of its sectors, rotational delays are eliminated. As a result, the number of seeks to be done is minimized and the access time involved is shortened.

4. Variations

Although the description above contains many specificities, these should not be construed as limiting the scope of the invention but as merely providing illustrations of some of the presently preferred embodiments of this invention. For example, while a typical servo area structure was discussed in conjunction with FIG. 7, this is not limitative of the invention. The invention applies regardless of the number of servo areas per track as long as they are laid out radially. The number of sectors may also be varied from one zone to another. The invention also applies regardless of the number of sectors between servo areas (i.e., in a servo frame), shown varied in the examples of FIGS. 8A and 8B.

C2 sectors need not be allocated at the beginning or at the end of a sector number sequence. The locations of C2 sectors are determined by the number of all sectors in the two-servo frame setup.

The ECC block increments shown in FIGS. 9 and 23 are only examples. There is no upper limit or lower limit to the ECC block increment count that may be determined in accordance with system requirements. This invention applies regardless of the C1 structure.

The C2 sectors recorded on the disc may be laid out in fixed locations if LBA can be designated. More specifically, all C2 sectors may be located within particular servo frames as shown in FIGS. 16 and 18, or they may be laid out in randomly spread-out fashion. Ultimately, in the example of FIG. 18, the ECC block may be constituted by eight servo frames regardless of their intra-block locations, with seven servo frames composed of data and one servo frame made of C2. In the examples of FIGS. 16 and 18, the ECC block may span multiple tracks. In the example of FIG. 24, the C2 sectors recorded on the disc may be located anywhere as long as they make up an ECC block per track.

In connection with the third embodiment, the ECC block structure was shown to be different from one zone to another. Alternatively, the ECC block structure may be varied in increments other than zones. For example, the same ECC structure may cover a plurality of zones (e.g., zones 1 and 2 share the same structure while zone 0 is differently structured). In another example, a single zone may contain regions of a different ECC structure each. These variable ECC block structures on the disc need only be supplemented with the C2 setup reflecting the servo area settings.

The program according to this invention is a program that implements the above-described functions of the HDD 10. The inventive program is started by the CPU 11. In operation, the components of the HDD 10 are controlled by the program in a manner suitably executing the processes outlined in FIGS. 17, 19 and 25. The program may be held beforehand in, say, the ROM/RAM 12. Alternatively, the program may be stored on the magnetic disc 21 and loaded into the ROM/RAM 12 upon use.

As described above, the first embodiment of this invention provides a data recording/reproducing apparatus, a data recording/reproducing method, a program, and a recording medium for reproducing data in a stable and efficient manner with reduced redundancy in the use of error correction codes.

Using the first error correction code increment makes it possible to correct intra-sector random errors, and resorting to the second error correction code increment permits correction of errors exceeding the intra-sector correctable range as well as burst errors spanning a plurality of sectors. This feature provides a highly stable system capable of suitably correcting errors under conditions preventing retry operations from getting performed in order to keep data transfer rate above a predetermined level. By correcting random errors and burst errors over an appreciably wider range than before and by averting retry operations, the first embodiment permits stable reproduction of data without incurring drops in data transfer rate.

When the structure of the second error correction code (C2) increment is established in keeping with slip status, it is possible to prevent fluctuations in the performance of error correction caused by slip-induced changes in redundancy rate and to minimize adverse effects caused by slips on the data transfer rate.

When the second error correction code is set for each zone in accordance with slip information, the error correction performance is made uniform over the entire disc surface. This feature further provides an efficient disc format. These capabilities combine to make up a system that is much more stable than ever before.

In operation, the first embodiment of this invention first causes the target track to be reached by a seek and, starting from the sector where the magnetic head is positioned on the track, allows the entire track to be accessed continuously. When access to the disc is thus executed on a track-by-track basis, it is possible to implement data access control without incurring rotational delays. This feature significantly reduces the time to access data.

The second and the third embodiments of this invention also provide, as described above, a data recording/reproducing apparatus, a data recording/reproducing method, a program, and a recording medium for reproducing data in a stable and efficient manner with reduced redundancy in the use of error correction codes.

Using the first error correction code increment makes it possible to correct intra-sector random errors, and resorting to the second error correction code increment permits correction of errors exceeding the intra-sector correctable range as well as burst errors spanning a plurality of sectors. This feature provides a highly stable system capable of suitably correcting errors under conditions preventing retry operations from getting performed in order to keep data transfer rate above a predetermined level. By correcting random errors and burst errors over an appreciably wider range than before and by averting retry operations, the embodiments permit stable reproduction of data without incurring drops in data transfer rate.

When the structure of the second error correction code (C2) increment is established in keeping with the servo area settings such as the number of sectors in the servo frame, it is possible to implement a more stable system with enhanced efficiency and reduced redundancy in the use of error correction code increments.

When the second error correction code is set for each zone in accordance with the servo area settings, the error correction performance is made uniform over the entire disc surface, and an efficient disc format is acquired. These capabilities also combine to form a more stable system than ever before.

In operation, the second and the third embodiments of this invention also cause the target track to be reached by a seek and, starting from the sector where the magnetic head is positioned on the track, allow the entire track to be accessed continuously. When access to the disc is thus executed on a track-by-track basis, it is possible to bring about data access control without incurring rotational delays. This feature also reduces the time to access data appreciably.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A data recording/reproducing apparatus for use with a disc recording medium having a plurality of any one of concentric and spiral tracks formed thereon, each of the tracks being divided into a plurality of sectors, the data recording/reproducing apparatus comprising:
    seeking means for seeking a target track;
    data accessing means for accessing data on the target track reached by the seek; and
    error correcting means for correcting error in the data based on an error correction code generated by the error correcting means for error correction purposes;
    wherein the error correcting means establishes a first error correction code increment per predetermined data quantity, establishes a second error correction code increment for a plurality of first error correction code increments depending on information about status on the disc recording medium, and forms error correction blocks each constituted by a plurality of the first error correction code increments and by the second error correction code increment added to the first error correction code increments.

2. The data recording/reproducing apparatus according to claim 1, wherein the error correcting means establishes the first error correction code increment per predetermined data quantity, establishes the second error correction code increment for the plurality of first error correction code increments depending on information about slips occurring on the disc recording medium, and forms the error correction blocks each constituted by the plurality of first error correction code increments and by the second error correction code increment added to the first error correction code increments.

3. The data recording/reproducing apparatus according to claim 2, wherein the error correcting means establishes the second error correction code increment depending on whether there exists slips of a predetermined length over those tracks on the disc recording medium which record the predetermined data quantity.

4. The data recording/reproducing apparatus according to claim 2, wherein the error correcting means generates the error correction code using a Reed-Solomon code method.

5. The data recording/reproducing apparatus according to claim 2, wherein the error correction block formed by the error correcting means has an interleave structure in the second error correction code increment.

6. The data recording/reproducing apparatus according to claim 2, wherein the error correcting means forms the error correction block in such a manner that two or more error correction blocks do not exist per track and that the error correction block is complete per any one of track and multiple track count.

7. The data recording/reproducing apparatus according to claim 2, wherein the data accessing means accesses data on the target track reached by the seeking means, the access being started from the first accessible sector of the target track and continued over an entire track.

8. The data recording/reproducing apparatus according to claim 7, wherein the data accessing means during a write access operation assigns relative location addresses successively to the sectors of the target track starting from the sector from which the access is started, and wherein the data accessing means during a read access operation rearranges the data read from the sectors of the target track in accordance with the relative location addresses so as to reconstitute the written data.

9. The data recording/reproducing apparatus according to claim 2, wherein the error correcting means handles the information about the slips in increments of sectors.

10. The data recording/reproducing apparatus according to claim 2, wherein the error correcting means changes structurally the second error correction code increment if the slips occur in predetermined increments of sectors over those tracks on the disc recording medium which record the predetermined data quantity.

11. The data recording/reproducing apparatus according to claim 2, wherein the error correcting means changes any one of a component sector count, a parity sector count, and an interleave structure when changing structurally the second error correction code increment is established.

12. The data recording/reproducing apparatus according to claim 2, wherein the error correcting means can change structurally the error correction block on the disc recording medium.

13. The data recording/reproducing apparatus according to claim 2, herein the disc recording medium is formed by a zone bit recording method so that the number of sectors per track varies with radial locations on the disc.

14. The data recording/reproducing apparatus according to claim 13, wherein the error correcting means forms the error correction block in a different structure per zone on the disc recording medium.

15. The data recording/reproducing apparatus according to claim 13, wherein the error correcting means establishes structurally the second error correction code increment for the track where slips exist, depending on the zone of the disc recording medium.

16. The data recording/reproducing apparatus according to claim 13, wherein the error correcting means establishes structurally the second error correction code increment for the track where slips exist, regardless of the zone of the disc recording medium.

17. The data recording/reproducing apparatus according to claim 13, wherein the error correcting means establishes structurally the second error correction code increment for the track where slips exist, using a fixed value.

18. The data recording/reproducing apparatus according to claim 1, wherein the error correcting means establishes the first error correction code increment per predetermined data quantity, establishes the second error correction code increment for the plurality of first error correction code increments depending on servo areas established on the tracks formed on the disc recording medium, and forms the error correction blocks each constituted by the plurality of first error correction code increments and by the second error correction code increment added to the first error correction code increments.

19. The data recording/reproducing apparatus according to claim 18, wherein the error correcting means establishes the second error correction code increment depending on the number of the first error correction increments in a segment flanked by two of the servo areas on the tracks.

20. The data recording/reproducing apparatus according to claim 19, wherein the error correcting means establishes the second error correction code increment depending on an integral multiple of the number of the first error correction increments in the segment flanked by two of the servo areas on the tracks, and/or on a redundancy rate of the second error correction code increment in the error correction block.

21. The data recording/reproducing apparatus according to claim 19, wherein the error correcting means establishes the number of sectors each including the second error correction code, on the basis of the number of sectors constituting the first error correction code increment in the segment flanked by two of the servo areas on the tracks.

22. The data recording/reproducing apparatus according to claim 18, wherein the disc recording medium is formed so that the servo areas are located radially on the disc.

23. The data recording/reproducing apparatus according to claim 18, wherein the error correcting means generates the error correction code using a Reed-Solomon code method.

24. The data recording/reproducing apparatus according to claim 18, wherein the error correction block formed by the error correcting means has an interleave structure in any one of the first and the second error correction code increment.

25. The data recording/reproducing apparatus according to claim 18, wherein the data accessing means accesses data on the target track reached by the seeking means, the access being started from the first accessible sector of the target track and continued over the entire track.

26. The data recording/reproducing apparatus according to claim 25, wherein the data accessing means during a write access operation assigns relative location addresses successively to the sectors of the target track starting from the sector from which the access is started, and wherein the data accessing means during a read access operation rearranges the data read from the sectors of the target track in accordance with the relative location addresses so as to reconstitute the written data.

27. The data recording/reproducing apparatus according to claim 25, wherein the error correcting means establishes the second error correction code increment depending on the number of the servo areas along the target track and on the number of the first error correction code increments along the target track.

28. The data recording/reproducing apparatus according to claim 25, wherein the error correcting means forms the error correction block in such a manner that two or more error correction blocks do not exist per track and that the error correction block is complete per any one of track and multiple track count.

29. The data recording/reproducing apparatus according to claim 18, wherein the error correcting means can change structurally the error correction block on the disc recording medium.

30. The data recording/reproducing apparatus according to claim 18, wherein the disc recording medium is formed by a zone bit recording method so that the number of sectors per track varies with radial locations on the disc.

31. The data recording/reproducing apparatus according to claim 30, wherein the error correcting means forms the error correction block in a different structure per zone on the disc recording medium.

32. The data recording/reproducing apparatus according to claim 31, wherein the error correcting means changes structurally the error correction block in accordance with zone change information.

33. The data recording/reproducing apparatus according to claim 30, wherein the error correcting means fixes structurally the error correction block regardless of the zone on the disc recording medium.

34. A data recording/reproducing method for use with a disc recording medium having a plurality of any one of concentric and spiral tracks formed thereon, each of the tracks being divided into a plurality of sectors, the data recording/reproducing method comprising:
    seeking a target track;
    accessing data on the target track reached in the seeking step; and
    correcting error in the data based on an error correction code generated in the error correcting step for error correction purposes;
    wherein the error correcting step establishes a first error correction code increment per predetermined data quantity, establishes a second error correction code increment for a plurality of first error correction code increments depending on information about status on the disc recording medium, and forms error correction blocks each constituted by a plurality of the first error correction code increments and by the second error correction code increment added to the first error correction code increments.

35. The data recording/reproducing method according to claim 34, wherein the error correcting step establishes the first error correction code increment per predetermined data quantity, establishes the second error correction code increment for the plurality of first error correction code increments depending on information about slips occurring on the disc recording medium, and forms the error correction blocks each constituted by the plurality of first error correction code increments and by the second error correction code increment added to the first error correction code increments.

36. The data recording/reproducing method according to claim 34, wherein the error correcting step establishes the first error correction code increment per predetermined data quantity, establishes the second error correction code increment for the plurality of first error correction code increments depending on servo areas established on the tracks formed on the disc recording medium, and forms the error correction blocks each constituted by the plurality of first error correction code increments and by the second error correction code increment added to the first error correction code increments.

37. A recording medium comprising a first error correction code increment established per predetermined data quantity, a second error correction code increment established for a plurality of first error correction code increments, and an error correction block formed with a plurality of the first error correction code increments and with the second error correction code increment added to the first error correction code increments;
    wherein, in the error correction block, the second error correction code increment is structured depending on information about status on each of a plurality of recording tracks formed either concentrically or spirally; and
    wherein data having the structure of the error correction block are recorded to each of the recording tracks.

38. The recording medium according to claim 37, wherein, in the error correction block, the second error correction code increment is structured depending on information about slips occurring on each of the recording tracks formed any one of concentrically and spirally; and wherein the data having the structure of the error correction block are recorded to each of the recording tracks.

39. The recording medium according to claim 37, wherein, in the error correction block, the second error correction code increment is structured depending on servo areas established on each of the recording tracks formed any one of concentrically and spirally; and wherein the data having the structure of the error correction block are recorded to each of the recording tracks.

* * * * *